(12) United States Patent
Blackburn et al.

(10) Patent No.: US 12,097,480 B2
(45) Date of Patent: Sep. 24, 2024

(54) FUNCTIONALISED ALUMINA ADSORBENT MATERIALS FOR REMOVAL OF CONTAMINANTS FROM WATER

(71) Applicant: PURAFFINITY LTD, London (GB)

(72) Inventors: Octavia Ann Blackburn, London (GB); Khai Duong Quang Nguyen, London (GB); Liberty Jocasta Rockey, London (GB); Aiden Sinan McGuirk, London (GB); Alex Michael James, London (GB); Nathan Clemence, London (GB); Simon Paul Foxon, Hertfordshire (GB)

(73) Assignee: PURAFFINITY LTD, London (GB)

( * ) Notice: Subject to any disclaimer, the term of this patent is extended or adjusted under 35 U.S.C. 154(b) by 0 days.

(21) Appl. No.: 18/124,139

(22) Filed: Mar. 21, 2023

(65) Prior Publication Data
US 2023/0264170 A1  Aug. 24, 2023

Related U.S. Application Data

(63) Continuation of application No. PCT/EP2023/053985, filed on Feb. 16, 2023.

(30) Foreign Application Priority Data

Feb. 16, 2022 (GB) .................................. 2202072

(51) Int. Cl.
*B01J 20/26* (2006.01)
*B01J 20/08* (2006.01)
*B01J 20/28* (2006.01)

(52) U.S. Cl.
CPC ............. *B01J 20/262* (2013.01); *B01J 20/08* (2013.01); *B01J 20/28016* (2013.01); *B01J 20/28083* (2013.01); *B01J 20/28085* (2013.01); *B01J 20/28092* (2013.01)

(58) Field of Classification Search
CPC .... B01J 20/26; B01J 20/262; B01J 20/28083; B01J 20/28085; B01J 20/28092
USPC ......................................................... 502/402
See application file for complete search history.

(56) References Cited

U.S. PATENT DOCUMENTS

| | | |
|---|---|---|
| 5,914,044 A | 6/1999 | Lindoy et al. |
| 10,836,654 B1 | 11/2020 | Gray et al. |
| 2011/0186522 A1 | 8/2011 | Martin |
| 2013/0095996 A1 | 4/2013 | Buelow et al. |
| 2022/0055015 A1 | 2/2022 | Kupracz |

FOREIGN PATENT DOCUMENTS

| | | | |
|---|---|---|---|
| JP | 2013078724 A | | 5/2013 |
| WO | 2017178100 A1 | | 10/2017 |
| WO | 2019186166 A1 | | 10/2019 |

*Primary Examiner* — Edward M Johnson
(74) *Attorney, Agent, or Firm* — NIXON PEABODY LLP; David S. Resnick; Nicole D. Kling

(57) ABSTRACT

A composition is provided for removal of a target substance from a fluid stream. The composition may be used to remove polyfluorinated alkyl substances (PFAS) from water. The composition comprises a support material comprising an alumina; and a sorbent molecule that comprises a core polymer; wherein the core polymer is covalently linked to the support material; and wherein the sorbent molecule further comprises one or more covalently linked sorbent groups. Processes for removal of target substances such as PFAS are also provided.

20 Claims, 18 Drawing Sheets

FUNCTIONALISED ALUMINA ADSORBENT MATERIALS FOR REMOVAL OF CONTAMINANTS FROM WATER

CROSS-REFERENCE TO RELATED APPLICATIONS

This application is a continuation under 35 U.S.C. § 120 or 35 U.S.C. § 365(c) of co-pending International Patent Application PCT/EP2023/053985 filed Feb. 16, 2023, which designates the U.S. and which claims benefit under 35 U.S.C. § 119(a) of G.B. Provisional Application No. 2202072.1 filed Feb. 16, 2022, the contents of which are incorporated herein by reference in their entireties.

FIELD OF THE INVENTION

The invention is concerned with the removal of target substances from liquids, such as water, using alumina-based substrate materials chemically modified with polyamines, as well as methods to produce such materials. The present invention further relates to materials for water treatment, sorbent media, amine surface functionalisation, hydrophobic interactions, perfluoroalkyl and polyfluoroalkyl substances (PFAS), water contaminants and filtration devices.

BACKGROUND OF THE INVENTION

There exists an on-going need for the remediation and recycling of contaminated supplies of key fluid solvents, such as water. It is necessary to re-use and replenish existing resources rather than simply dispose of them. Global environmental protection regulations also require water supplies threatened with contamination from industrial activity to meet increasingly stringent purity standards. One such standard is NSF-53, established by National Sanitary Foundation International, which sets criteria for adsorption/filtration that occurs when liquid, gas or dissolved/suspended matter adheres to the surface of, or in the pores of, an adsorbent media. Carbon filters, containing powdered or activated carbon are an example of the types of media that are used in water filtration products that conform to NSF-53.

There are diverse sources of environmentally damaging pollutants, including wastewater from industrial plants and chemical process facilities which has been improperly disposed of; surface runoff containing fertilisers and pesticides used on agricultural areas; and cleaning detergents as well as flame retardants used in fire-fighting foams. Many industrial chemical contaminants can persist in nature for decades before degrading, and can cause great harm to plants, animals and humans, even at very low concentrations. The impact on ecological systems is also profound, with persistent pollutants often concentrating in the bodies of organisms higher up the food chain.

One particular class of persistent environmental pollutants includes halogenated organic compounds such as poly- and perfluorinated alkyl substances (PFAS). PFAS are organofluorine compounds that are considered to be chemically inert. They are persistent in the environment and their use is controlled in many countries by the United Nations Framework Convention on Climate, the "Kyoto Protocol" and REACH. Perfluorooctane sulfonic acid (PFOS) and its derivatives have been included in the Stockholm Convention and are restricted within the EU under the Persistent Organic Pollutant (POP) regulation. PFOS and perfluorooctanoic acid (PFOA) are toxic PFAS compounds that are used extensively as surfactants and in flame retardants for fire-fighting foams and metal plating processes. Both PFOS and PFOA persist in the environment for very long periods of time and are recognised contaminants in most of the world's fresh water supplies.

Adsorption of PFAS compounds such as PFOS and PFOA, onto granular or powdered activated carbon represents a current recommended solution for their removal from contaminated water. However, the process is slow and inefficient. In particular, the shorter chain PFAS pollutants quickly "break-through" beds of activated carbon, meaning large quantities of activated carbon are required, which must be frequently replaced once saturated with PFAS. Currently, adsorbed PFAS cannot efficiently be washed off activated carbon for regeneration "in situ". In addition, a significant proportion of activated carbon manufactured globally is derived from fossil fuels, such as bituminous coal, which is activated via physical processes that release substantial amounts of carbon dioxide. Hence, activated carbon represents an expensive, non-sustainable and single use solution to the problem of removing PFAS from contaminated water. Ion exchange approaches are also commonly used, but such methods also have a large carbon footprint, and reliability is again an issue due to breakthrough. Operational longevity and cost-effectiveness are also problematic for ion exchange based resins.

Previous efforts to remove PFAS contaminants from water include, for example, the use of cellulosic supported materials functionalised with high molecular weight polyamines such as polyethylenimine (PEI, typically 25 kDa), combined with hydrophobic groups (see WO2017/203281). Such approaches rely predominantly on the sorbent activity of the functional group rather than any particular contribution from the supporting substrate material.

Alumina based filtration membranes for the removal of perfluoroalkyl species from water have also been contemplated using alumina functionalised with linear fluorinated silanes containing 13-17 fluorine atoms (Johnson et al. ACS Omega, 2019, 4, 8001). Whilst such membranes showed high levels of specificity for removing PFAS from contaminated water the amphiphilic silane molecule used as the sorbent molecule has to be synthesised. This creates its own problems as the perfluorinated waste generated in the synthesis of these sorbent filtration membranes is greater than the actual mass of PFAS removed by the membrane when in use. Hence, the improvement in performance is offset by the environmental cost and subsequent commercial non-viability of the approach.

There exists a need to provide economical and re-usable compositions and processes that enable the removal of low concentrations (<1 ppm) of target substances, in particular polluting contaminants, such as PFAS, from fluid streams, such as wastewater or within the wider environment. The present invention seeks to overcome the present challenges, including reducing the impact of industrial activity on the aquatic environment, and to meet these objectives.

SUMMARY OF THE INVENTION

The present invention provides further surprising development of present technology, in particular regarding the novel functionalisation of alumina to optimise and fine tune them towards improved adsorption of a wide range of poly- and perfluorinated alkyl substances (PFAS), indicating the presently demonstrated surface functionalisation may be widely applicable for remediation of PFAS contamination in water supplies.

A first aspect of the invention provides a composition for removal of a target substance from a fluid stream, the composition comprising:
- a support material comprising an alumina; and
- a sorbent molecule that comprises a core polymer;

wherein the core polymer is covalently linked to the support material; and
wherein the sorbent molecule further comprises one or more covalently linked sorbent groups.

Suitably, the core polymer is a linear or branched polymer.

A second aspect of the invention provides for a composition for removal of a poly- and perfluorinated alkyl substance (PFAS) from an aqueous liquid, the composition comprising:
- a particulate support material comprising a bimodal alumina having a mesoporous and a macroporous content, wherein the bimodal alumina has a BET pore volume within the mesoporous range of not less than around 0.20 cm$^3$/g; and
- a sorbent molecule that comprises a linear or branched core polymer selected from one or more of: poly(allylamine); poly(methylmethacrylate); poly(vinylalcohol); poly(vinylamine); poly(vinylchloride); poly(ethylenimine); poly(2-vinylpyridine); poly(3-vinylpyridine); and poly(4-vinylpyridine);

wherein the core polymer is covalently linked to the support material; and wherein the sorbent molecule further comprises one or more covalently linked sorbent groups.

A third aspect provides a process for removal of a target substance from a fluid stream, suitably an aqueous feedstream, comprising contacting the feedstream with a composition as described herein. The target substance may comprise one or more PFAS. Typically the aqueous feedstream is selected from: contaminated water; waste water; ground water; drinking water; seawater; and industrial or agricultural runoff.

In a fourth aspect provides a process for removal of a target substance from a fluid stream comprising contacting the fluid stream with a composition a support material comprised of a particulate alumina and a sorbent molecule that comprises a core polymer; wherein the core polymer is covalently linked to the support material; and wherein the sorbent molecule further comprises one or more covalently linked sorbent groups selected from one or more groups selected from: a substituted or unsubstituted C1-C12 alkyl group; a substituted or unsubstituted C2-C12 alkenyl group; a substituted or unsubstituted C2-C12 alkynyl group; a substituted or unsubstituted C1-C12 alkoxy group; a substituted or unsubstituted C1-C12 acyl group; a substituted or unsubstituted aromatic hydrocarbon group; a substituted or unsubstituted aromatic group; a heterocyclic group; and a hydrogen atom.

In a fifth aspect the compositions described herein are deployed within a filter, which may also be comprised of a bed or a packed column, and the fluid stream is passed through or across the filter, bed or packed column. Suitably, the filter is for the adsorption of one or more PFAS from a contaminated water source. The filter may be used within a point-of-use (POU) or point-of-entry (POE) water filtration system.

Within the scope of this disclosure it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

DETAILED DESCRIPTION OF THE INVENTION

Figure 1:
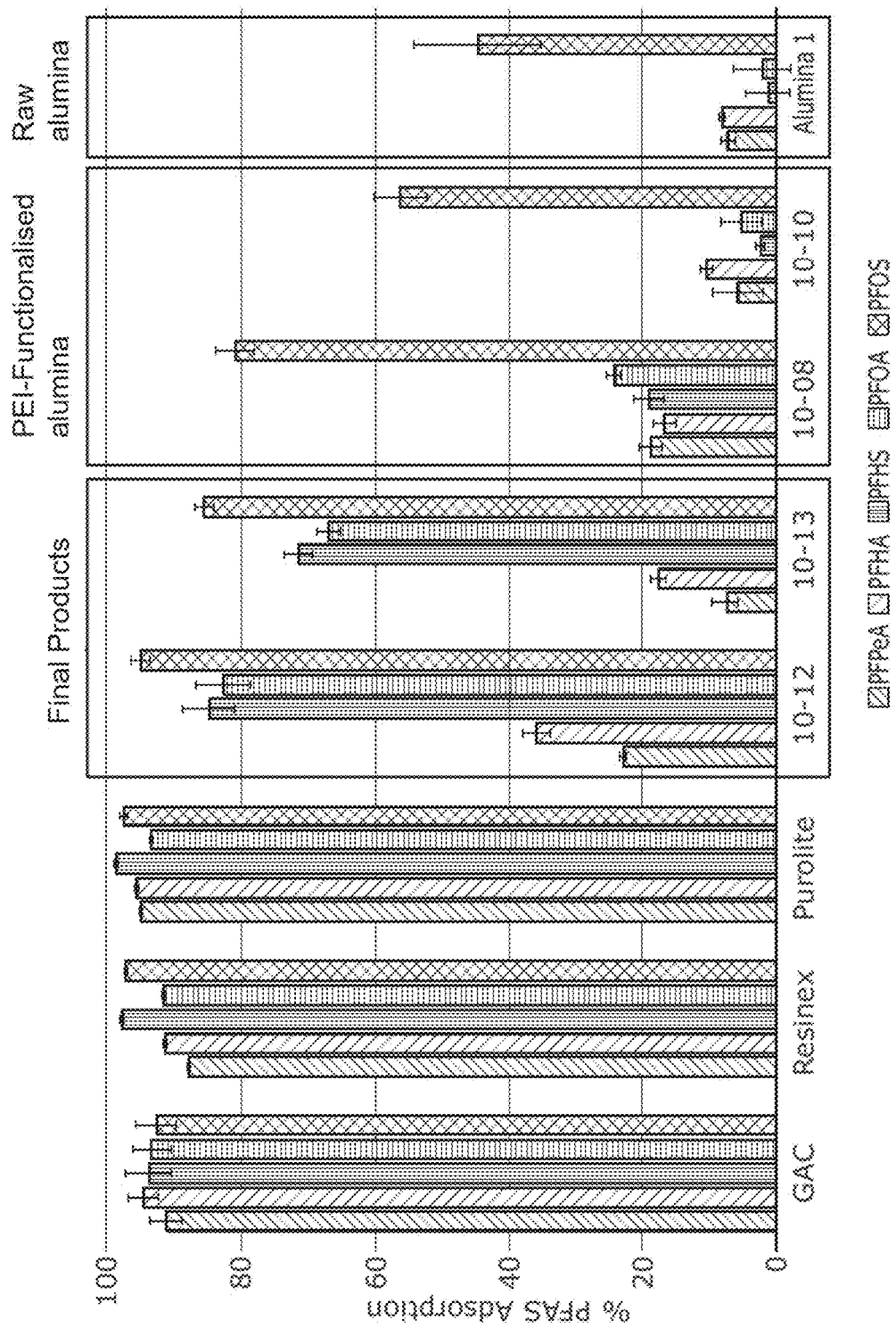
FIG. 1 shows a graph of a batch test for removal (% adsorption) of five different PFAS contaminants from water samples: granular activated carbon (GAC), Resinex and Purolite represent comparators for existing known sorbent materials. Raw alumina is also tested (alumina 1) as a comparator unfunctionalised support material. Two alumina samples are functionalised with a core polymer, 25 KDa PEI, at two levels of surface activation (10-08 and 10-10), and both are respectively also tested following further modification to incorporate C8 acyl sorbent groups (10-12 and 10-13).

Unless otherwise indicated, the practice of the present invention employs conventional techniques of chemistry, materials science and process engineering, which are within the capabilities of a person of ordinary skill in the art.

Prior to setting forth the invention, a number of definitions are provided that will assist in the understanding of the invention. All references cited herein are incorporated by reference in their entirety. Unless otherwise defined, all technical and scientific terms used herein have the same meaning as commonly understood by one of ordinary skill in the art to which this invention belongs.

As used herein, the term 'comprising' means any of the recited elements are necessarily included and other elements may optionally be included as well. 'Consisting essentially of' means any recited elements are necessarily included, elements that would materially affect the basic and novel characteristics of the listed elements are excluded, and other elements may optionally be included. 'Consisting of' means that all elements other than those listed are excluded. Embodiments defined by each of these terms are within the scope of this invention.

The term 'target' or 'target substance' refers herein to a substance or compound which it is desired to remove or isolate from a fluid. Target substances can be dissolved (i.e. a solute), suspended, emulsified, dispersed, or otherwise carried in the fluid, and as such may be soluble, partially soluble or insoluble in the fluid. As discussed below, target substances can comprise contaminant substances and/or valuable substances which it is desired to remove, and in some cases recover, from the target fluid.

Target substances as contemplated herein can include 'contaminants' or 'contaminant substances'. In the context of the present invention, 'contaminants' are intended to encompass substances which may be harmful to the health of humans or animals, or to the environment. Consequently, derivative terms are defined accordingly, for example, a contaminated fluid is a fluid comprising a contaminant substance. Typically, the contaminant comprises one or more per- and polyfluoroalkyl substances (PFAS), typically one or more perfluorocarbons, optionally selected from a perfluorinated anionic surfactant compound, including one or more selected from the group consisting of: perfluoropentanoic acid (PFPeA); perfluorooctanoic acid (PFOA); perfluorobutanesulfonic acid (PFBS); perfluorohexanesulfonic acid (PFHS); perfluorohexanoic acid (PFHA); perfluorooctanesulfonic acid (PFOS); perfluorononanoic acid (PFNA); perfluorodecanoic acid (PFDA); 6:2 fluorotelomer sulfonic acid (6:2 FTSA); and hexafluoropropylene oxide dimer acid (HFPO-DA, also known as a GenX chemical, with chemical name 2,3,3,3-tetrafluoro-2-(heptafluoropropoxy)propanoic acid). In some embodiments, the contaminant comprises an organic compound, optionally a pharmaceutical or pesticide molecule including one or more selected from the group consisting of: diclofenac, erythromycin, oestrogens, oxadiazon and thiamethoxam. The contaminant may in some embodiments be a metal or metalloid ion, optionally selected from copper, iron, lead, mercury, chromate or arsenate.

The term 'fluid stream' or feedstream' refers to a flowable substance, suitably a liquid, including an aqueous liquid, in which the target substance is dissolved, suspended, emulsified, dispersed, or otherwise carried. Typically, the liquid contains water, or is predominantly water based, and may be in the form of: contaminated water; waste water; drinking water; seawater; and/or industrial or agricultural runoff.

The term 'sorption', 'sorb', 'sorbent' and derivatives as used herein refer to the removal of target substances such as contaminants from the fluid stream by the association of said target substances with the modified support material described. Sorption by the material may happen by any means, for example by adsorption to the surface of the material, which may be by the creation of chemical interactions between the target substance and the support material, including electrostatic attraction, hydrophobic interactions, the formation of covalent bonds, ligation, chelation, van der Waals forces, hydrogen bonds, or otherwise. 'Sorption' may also refer to absorption of the target substance into the material. The target substance may become physically trapped inside intermolecular space, pores or other voids within the material. In particular, sorption may be adsorption occurring by the formation of chemical interactions between the target substance molecule and the sorbent molecules as defined herein with which the sorbent material has been modified. Such chemical interactions lead to the sequestration of the target substance within the sorbent material and out of the fluid stream. Use herein of the term 'adsorption' or derivatives thereof is not intended to be bound by any theoretical limitation, but rather is intended to include sorption by other means, as defined above, except where otherwise specified.

The term 'sorbent material' as defined herein refers to a material comprising a support or substrate material, which further comprises a sorbent molecule attached or bonded thereto. The sorbent material is suitable for contacting a fluid stream that comprises a target substance, such as a contaminant, which may be a PFAS, such that the target substance is adsorbed onto or otherwise taken up from the fluid stream and sequestered by the sorbent material. Suitably the sorbent material is deployed within a filter/purifier and/or a bed or a packed column (e.g. including a plurality of stacked filters) and the fluid stream is passed through or across the filter, bed or packed-column. The sorbent material may be deployed within a mixed bed combined with another adsorbent material such as granular activated carbon or an ion-exchange resin. In one embodiment the sorbent material is comprised within a prepared component such as a filter cartridge, so that used sorbent material can be conveniently contained, and similarly replaced or replenished with fresh or regenerated sorbent material as necessary. Alternatively, the sorbent material may be added to the fluid as a dispersion. The sorbent material may be particulate, that is to say in the form of granules; flakes; beads; pellets; or pastilles. The sorbent material may be a powder which can advantageously provide higher accessible surface area. The sorbent material may be incorporated into a membrane, or membrane-like filter. Membranes comprised of the alumina substrate material can also be functionalised as described herein directly. In particular, a membrane or membrane-like product, can be used to make filters. An advantage of filters of this kind is that they can be made with specific thickness, and with a large surface area, while also ensuring that fluid passes through when appropriately installed in a fluid flow path with minimum reduction in flow rate. Further, filters can combine the functionality of the invention with particulate (size exclusion) removal capabilities. The filtration bed or column may be occasionally backflushed, to clear build-up of occlusions, such as organic matter or lime scale, that reduce flow rate.

In one embodiment, the sorbent material is particulate, suitably granular in form, with an average diameter size of the particles or granules (as measured by the largest diameter of the particles) is greater than about 0.01 mm, suitably greater than about 0.1 mm, and typically less than about 5 mm, less than around 3 mm, and optionally less than about 1 mm, or even less than around 700 µm. In one embodiment of the invention the granules have a d50 average particle size of around 600 µm in diameter.

In a further embodiment, the sorbent material is particulate, suitably powder in form, with an average diameter size of the particles (as measured by the largest diameter of the particles) greater than about 0.1 µm, suitably greater than about 1 µm, optionally greater than 50 µm and typically less than about 300 µm. Typically, powdered aluminas suitable for use in embodiments of the present invention have a d50 average particle size of around 100 µm, optionally a majority of particles within the powder are over around 70 µm in diameter but less than around 300 µm. Powdered aluminas may include powders having spherical particles.

In a further embodiment, the sorbent material is a particulate composition, suitably spheroidal or spherical in form, with an average diameter size of the spheroids (as measured by the largest diameter of the particles) greater than about 0.5 mm, suitably greater than about 1 mm and up to around 5 mm in size.

In one embodiment of the present invention there is provided a composition for removal of target substances and/or contaminants from a fluid stream. The composition comprises a sorbent material comprising a support material covalently linked to a target substance sorbent molecule. The support materials have high surface area to volume ratio and therefore provide an efficient support for molecules which are able to act as sorbents for target substances. The granular sorbent particles are designed to be deployed as a sorbent media for wastewater treatment in a standard packed bed. The granules have some porosity but are hard, durable and resistant to degradation. Larger granular sorbent media are also suitable for large scale engineered applications (e.g. purification of water at industrial or municipal sites). Whereas, smaller particle sizes provide faster capture kinetics allowing for creation of broad-spectrum target substance removal products for the point-of-use (POU) and/or point-of-entry (POE) markets.

According to embodiments of the invention, the sorbent material may be able to be incorporated directly into a POU device, such as a cartridge-type filter, or made compatible with third party technology so as to be encapsulated within a sandwich membrane (e.g. a functionalised alumina bed between porous metal foil membranes), which then can be configured into a POU device. The design of a typical POU device should be suitable for connection to a typical household tap/faucet or supply pipe under the sink. The POU device and its components must withstand an inlet pressure of up to 6 bar (87 psi) without leakage or structural damage. This pressure is representative of the upper range of pressures found in most domestic settings. Since taps/faucets have varying supply pressure, the POU device must also function at the lower range of inlet pressures, as low as 1.4 bar (20 psi). Typical devices specify a range of inlet pressures from 1.4 bar to 5.5 bar (80 psi), with some rated up to 6.8 bar (99 psi). The minimum acceptable flow rate for most consumers is around 2 L/min, however some devices can treat at rates of up to 3 to 4 L/min. Almost all currently available products operate with a lifetime of 6 months (i.e. twice per year replacement). Given the unexpectedly high PFAS capacity of the compositions of the present invention, it is expected a product lifetime of 6 to 12 months is readily achievable. To last 12 months, around 4400 L of water (approximately 1200 US gallons) should be treated, which requires the device to demonstrate adequate treatment of 5280 L (20% greater capacity) of water before PFAS breakthrough in accordance with the NSF-53 certification test. In a specific embodiment of the invention, a POU device may be connected between an existing conventional water purification cartridge (which is not intended to remove PFAS) and the tap/faucet. In this configuration the POU device may provide an indication when replacement is required—e.g. based upon time or volume of flow through the device, or both. At this point the user may replace a cartridge that comprises the compositions of the invention without need to remove any piping connections. Spent cartridges may be regenerated according to methods described herein.

For POE applications, where water enters a building and the system continuously treats the water for the entire water supply to the building, the sorbent material may be comprised within a fiberglass reinforced plastic (FRP) cylindrical tank or cylinder. The amount of sorbent material may be designed to be used within an off-the-shelf FRP cylinder configuration which will, typically, allow for a capacity of around 10 to 20 litres of material to be held and which could have an operational life of one or more years of normal domestic use before the sorbent material needs to be replaced or regenerated. A typical POE system may comprise a plurality of water treatment cylinders, the sorbent material may be comprised within all cylinders as a subcomponent, or within one of the plurality of cylinders as a specialised component.

As used herein, the term "alumina" refers to the various mineral forms of aluminium oxide/hydroxide. The term alumina includes, for example, corundum ($Al_2O_3$), boehmite ($\gamma$-AlO(OH)), diaspore ($\alpha$-AlO(OH)), and gibbsite ($Al(OH)_3$) (e.g., bayerite, doyleite, and nordstrandite), and combinations thereof. The term alumina also includes the various phases and polymorphic forms of aluminium oxide/hydroxide—such as gamma ($\gamma$) alumina, alpha ($\alpha$) alumina, theta ($\theta$) alumina.

The sorbent compositions of the invention comprise a solid alumina support having a plurality of pores—i.e. cavities, channels or interstices which are deeper than they are wide. The pores are defined by a pore width/size/diameter which is typically considered to represent the distance between two opposite walls of the pore (e.g. diameter of cylindrical pores or a width of slit-shaped pores). Alumina, like most porous materials, may be divided into having micro-, meso- or macropores. Mesoporous materials are characterised by IUPAC as having predominance of pores with widths in the range of between 2 and 50 nm (Roquerol et al. (1994) Pure & Appl. Chem. 66(8): 1739-1758).

In embodiments of the invention the alumina support material is comprised of a mesoporous alumina in which a majority of pores are greater than 2 nm in diameter, suitably greater than 3 nm in diameter, typically greater than 4 nm in diameter, optionally greater than 10 nm. By 'majority' it is meant that greater than 50% of the porous volume is comprised within the mesoporous range as defined, typically greater than 60%, 70%, 80% and optionally greater than 90%.

In specific embodiments of the invention the alumina support material is comprised of an alumina having a bimodal porous structure in which a proportion of the porosity falls within the mesoporous range and a proportion falls within the macroporous range. Pores with diameters exceeding about 50 nm are typically referred to as macropores. In embodiments of the present invention, alumina having mesoporous properties as defined above and also having higher proportion of macropores within the range of around 100 nm to around 20 µm, suitably from around 0.5 µm to around 15 µm, optionally from around 1 µm to around 10 µm, are considered to exhibit advantageous sorbent properties. Hence, in a specific embodiment of the invention, a bimodal alumina support material is provided having a majority of porosity falling within a first distribution of pores having diameters within a mesoporous range of between about 2 nm and about 50 nm, and a second distribution of pores having diameters within a microporous range of around 1 µm to around 10 µm. Surprisingly, it has been found that bimodal aluminas of this kind provide a favourable balance between sorbency, when functionalised, structural resilience as well as optimal flow rates of liquids through a bed comprised of alumina particles. It will be appreciated that the present invention is not limited to bimodal aluminas, and may also comprise multimodal aluminas having porosity ranges falling within a combination of the mesoporous and macroporous ranges.

In specific embodiments of the present invention the alumina has a granular particle size range of around 300 to 3000 µm for so called larger particles, and a particle size range of from around 0.1 to 300 µm for so called smaller particles, e.g. powders. As described previously, smaller particles show utility as components within the design and manufacture of POU filtration devices, whereas the larger particles may be utilised in packed beds for POE, industrial or municipal scale purification plants. In specific embodiments of the invention, a filtration device may comprise a combination of any one of the sorbent materials Surface areas and porosities can be determined by gas adsorption-desorption methods such as the Brunauer-Emmett-Teller (BET) technique and mercury intrusion porosimetry, or typically a combination of such techniques. BET is a theory relating to gas adsorption onto a solid surface and essentially expands on Langmuir theory to include multi-layer formation. Mercury (Hg) intrusion is a physical technique which assesses pore size/volume through the interpenetration of the material with liquid Hg.

The sorbent material is linked to a sorbent molecule that is comprised of a polymer core, suitably a linear or branched polymer. The core polymer may be selected from one or more of the group consisting of: poly(allylamine); poly(methylmethacrylate); poly(vinylalcohol); poly(vinylamine); poly(vinylchloride); poly(ethylenimine); poly(2-vinylpyridine); poly(3-vinylpyridine); and poly(4-vinylpyridine).

In specific embodiments of the invention the core polymer comprises a linear or branched polyamine that functions as the structural core of the sorbent molecule. Polyamines are compounds comprising more than two amino groups. In embodiments of the present invention, the sorbent molecules comprise a polyamine core with a molecular weight greater than 500 Daltons (Da). In specific embodiments of the invention, the polyamine core is comprised of a polymer having a weight average molecular weight of greater than: 1 kDa, 2 kDa, 3 kDa, 5 kDa, 8 kDa, 10 kDa, 12 kDa, 15 kDa, 20 kDa, 25 kDa, 30 kDa, 40 kDa, 50 kDa, 75 kDa, 100 kDa, 250 kDa, 500 kDa, 750 kDa, 1000 kDa or more. In a specific embodiment the polyamine core has a weight average molecular weight of around 25 kDa or more. Highly branched polyamine polymers, sometimes termed 'dendrimers', comprise a plurality of primary amino groups on each polymer molecule and may be utilised in specific embodiments. The polyamines utilised in the sorbent molecules of the invention comprise at least one terminal amine.

In one embodiment of the invention the polyamine core comprises polyethylenimine (PEI), also known as polyazaridine or poly(iminoethylene). Suitably the PEI is a linear or branched PEI. Optionally, the core polymer comprises a poly(ethyleneimine) having a weight average molecular weight of around 25 kDa.

Scheme 1 below shows an initial synthetic procedure, according to an embodiment of the invention, employed to surface functionalise the alumina substrate to allow for binding of a core polymer. A first step is the functionalisation of the alumina surface. The initial functionalisation of the alumina surface is not limited to use of an organosilane. People skilled in the art will appreciate that oxide surfaces readily react with carbonyl containing compounds (aldehydes, carboxylic acids) and phosphorus containing compounds (e.g. phosphonic acids, esters etc). The skilled person will also understand that the density of hydroxyl groups on the surface of the substrate can be increased by treating the surface with compounds such as a base, an acid or a mixture of oxidising agents (e.g. $H_2O_2$ and HCl or $HNO_3$).

Scheme 1: Synthesis of the functionalised alumina substrate (any counter ions omitted for clarity).

Step 1

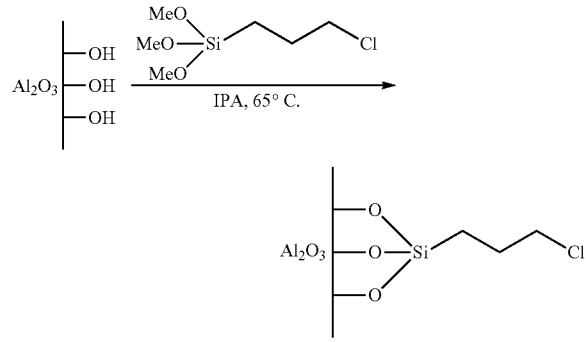

Step 2

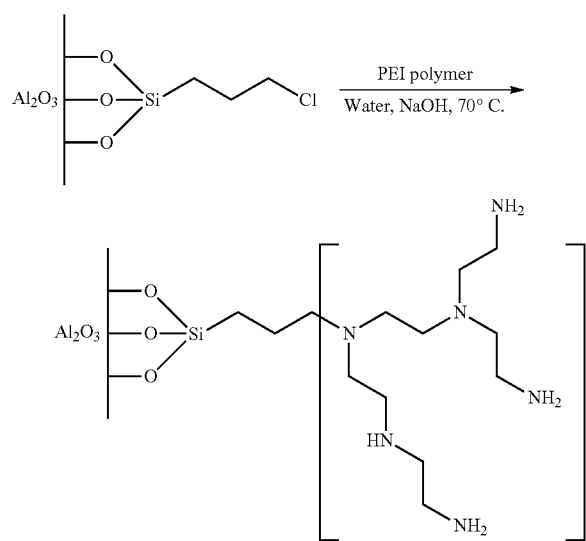

Step 3

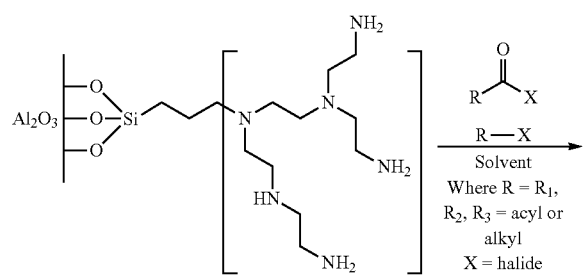

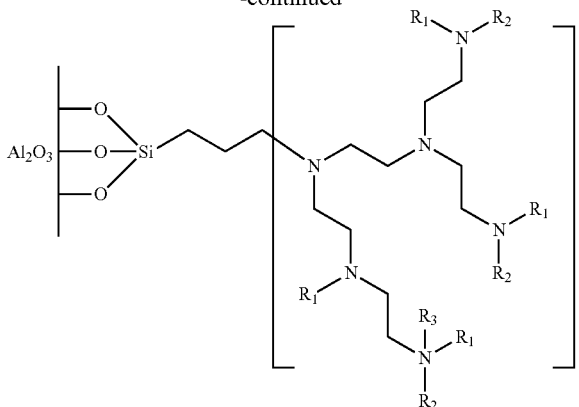

R1 and R2 and R3 may be the same or different, suitably R1, R2 and R3 may be one or more groups selected from: a substituted or unsubstituted C1-C12 alkyl group; a substituted or unsubstituted C2-C12 alkenyl group; a substituted or unsubstituted C2-C12 alkynyl group; a substituted or unsubstituted C1-C12 alkoxy group; a substituted or unsubstituted C1-C12 acyl group; a substituted or unsubstituted aromatic hydrocarbon group; a substituted or unsubstituted aromatic group; a heterocyclic group; and a hydrogen atom. In a specific embodiment, R1 is an C1-C12 acyl group, R2 is an alkyl group or a hydrogen atom and R3 is not present. As the polymer will vary in size, the above scheme shows as an approximation as defined within the square bracket. It will also be appreciated that the above scheme, whilst depicting branched polymer, is applicable also to use with linear polymers, e.g. linear PEI.

Step 1: Organosilanes are suitable reagents for functionalisation of the alumina surface as they are diverse in structure, readily available at scale, and are known to react with a wide range of oxide-containing surfaces. A functionalised organosilane is typically chosen so that once it is attached to the inorganic oxide surface the appended functional group serves as a point for further synthetic modification (described in Step 2 below). Reactive functional groups can be chosen from, but are not limited to: chloride; bromide; iodide; protected alcohol group; ester; epoxide; acrylamide; alkene; and alkyne. It will be appreciated that alternative chemistries for functionalisation of the alumina surface may also be adopted and are known to the skilled person.

The reactive functional group, in this example chloride, can be subsequently substituted by a wide range of nucleophiles. Nucleophiles, such as amines, or alcohols readily react with alkyl chlorides to form a carbon-nitrogen or a carbon-oxygen bond through a SN2-type nucleophilic substitution. It will be appreciated that it is possible to select organosilanes with other reactive functional groups (see the list above). In one embodiment, 2-propanol is the chosen solvent for the reaction, but the reaction may be performed in other alcohol containing solvents, or hexane, toluene or even in water.

Step 2: The silane functionalised alumina substrate is suitably reacted with a core polymer (e.g. as defined within square brackets in the scheme shown above) that contains one or more functional groups that can be derivatised further by addition of at least one sorbent group. Such core polymers can be selected from the group: poly(allylamine);

poly(methylmethacrylate); poly(vinylalcohol); poly(vinylamine); poly(vinylchloride); poly(ethyleneimine); poly(2-vinylpyridine); poly(3-vinylpyridine); and poly(4-vinylpyridine). Core polymers containing nitrogen atoms are particularly suitable as these can be derivatised further once linked to the silane functionalised alumina materials. Suitable weight average molecular weight ranges of the polymers are: PEI (0.8-1000 kDa); PVP (around 60-160 kDa); and PVC (around 48 kDa).

Step 3: The alumina intermediate containing the attached core polymer can be derivatised further to introduce sorbent groups to improve specificity of binding to particular target substances present in a fluid feedstream. If the core polymer chosen in Step 2 is a polyamine, the polyamine-alumina intermediate can be reacted with compounds such as acid chlorides (including, but not limited to, alkanoyl chlorides) to install amide functional groups, or by reaction with organohalides, hydrocarbon groups (e.g. alkyl, alkenyl, alkynyl, cycloalkyl or aryl groups) of various length or size can be introduced. The amine nitrogen atoms are versatile in that they can be derivatised by a wide range of reagents. Hence it is possible to derivatise the amine nitrogen centres through reaction with other reagents, such as: reductive amination with aldehydes to install alkyl chains; condensation with carboxylic acids to yield amides; Michael addition with double-bond containing compounds; addition to alkynes or alkenes; amidation reaction with esters (or other carbonyl containing compounds); reaction with strained cyclic systems; e.g. epoxides; aziridines; or reaction with organohalides: e.g. alkyl; benzyl; aryl etc. Hence, addition of different sorbent groups can be tailored to the particular target substances that are to be removed from the fluid stream.

It is a considerable advantage that sorbent compositions of the invention possess unique properties of sorbency that may be tuned to the specific requirements of the sorbent material. Hence, it is an advantage of the present invention that the sorbent material may be readily optimised to target specific substances and/or contaminants within a fluid stream by modifying the chemistry of the sorbent molecule. For example, sorbency properties can be optimised toward particular target substances via the combined selection of alumina properties (e.g. pore size), core polymer and/or sorbent group. In this way the physical properties of the support material synergise with the chemical properties of the sorbent molecule in order to provide unexpected properties in terms of target specific sorbency. These are most evident in embodiments of the invention described in detail below, where certain compositions show improved performance in the removal of a range of PFAS from water when compared to industry standard activated carbon compositions. According to specific embodiments of the present invention the primary targets for treatment in water supplies are poly or perfluorinated surfactants such as PFOA, PFOS, PFPeA, PFHA, PFHS, PFBA, PFBS, 6:2 FTSA and HFPO-DA.

It is also envisioned that treatment of runoff, wastewater or other water supplies to remove other target substances, contaminants or valuable substances (including precious or rare earth metals, for example present in wastewater from mining, purification or manufacturing processes), or treatment of other fluids such as biological media, organic solvents and oils or removal of impurities from liquid product streams, is possible. In addition, sorbent material according to the present invention could be used as a sorbent to remove target substances from a gaseous feedstream, such as carbon dioxide in direct air capture (DAC) apparatus.

Unlike other sorbents deployed in this way for organic pollutants, the sorbent material can be effectively regenerated in situ with a solvent wash step. The solvent wash can comprise an aqueous salt wash, an acid wash, a basic wash, or a combination, such as a salt and acid wash. The regeneration solution may further, or alternatively, comprise a non-aqueous polar solvent, such as acetone or an alcohol, such as ethanol, methanol or iso-propanol may be used. Suitably, where an aqueous wash is used the wash can comprise a liquid having a pH greater than 9, or alternatively a pH of less than 5. Optionally the wash solution comprises an aqueous ammonium hydroxide, ammonium chloride, ammonium sulphate potassium hydroxide, sodium bicarbonate or sodium hydroxide solution. In some embodiments, the wash liquid has a pH greater than 8, suitably greater than 9, or greater than 10. Where an acid wash is used it is suitably selected from an inorganic acid including hydrochloric acid, sulphuric acid, nitric acid, phosphoric acid or alternatively an organic acid suitably selected from acetic acid, hexanoic acid, ethanedioic acid or citric acid. The salt is suitably selected from a sodium, potassium or magnesium salt with a chloride, sulphate or phosphate counter ion. The possibility of regeneration is particularly advantageous, in that it allows for the removal of target substances for recycling, recovery or safe disposal, as well as allowing the reuse of the sorbent material. In this way the proposed method for removing target substances is further reduced in cost, and in production of waste in the form of spent sorbent material.

The regeneration process suitably includes removing the sorbent material from the fluid stream and contacting it with a washing solvent as described. In an alternative embodiment, the regeneration process involves replacing the fluid stream with a solvent wash for a period of time to effect regeneration.

Without wishing to be bound by theory, the adsorption of target substances to compositions as described herein appears to be the result, primarily, of non-covalent interactions, such as electrostatic interactions, with the polyamine core combined with hydrophobic-hydrophobic interactions with the covalently linked hydrophobic group. In the regenerating solvent wash step, interactions with polar groups such as anions in the wash substitute for the electrostatic interactions with anionic target substances, releasing the target substances in the wash. Raising or lowering the pH changes the protonation state of the polyamine core, which may further reduce the electrostatic binding interactions with the adsorbed target compounds. The presence of other ions such as ammonium, can improve the solubility of adsorbed target compounds, further increasing their removal in the regenerating solvent wash step.

Another salient advantage of the present system is its low cost and ease of production. Production of granules or other forms of sorbent material with a relatively low-cost core polymer and very low-cost support material (e.g. alumina) allows cost effective production of the material at large scale (~1000 kg per batch) allowing deployment in large volume wastewater applications (megalitres/day flow rate). In addition, the reactions involved with linking the sorbent substrate with the target substance-sorbent molecules may be carried out in large scale and, economically, often at relatively low temperatures (e.g. less than 100° C.) and at atmospheric pressures.

The invention is further illustrated by the following non-limiting examples.

Examples

Physical Characterisation of Alumina Support Material

The physical properties of the raw alumina substrates sourced and selected for functionalisation are shown below in Table 1.

TABLE 1

Properties of support materials

| Supplier | Alumina Name | Particle size | BET surface area (m²/g)[1] | Pore volume cm³/g[1] | Pore size BJH (nm)[1] | XRD Phases[2] | Particle size distribution (micron)[3] |
|---|---|---|---|---|---|---|---|
| Porocel | 1 | 20 × 50 mesh (300-850 μm) | 331 | 0.40 | 5 | γ-Al₂O₃ α-Al(OH)₃ (bayerite) γ-AlO(OH) (boehmite) κ-Al₂O₃ | d(1) = 258 d(10) = 447 d(50) = 774 d(90) = 1100 d(99) = 1390 |
|  | 2 | 14 × 28 mesh (600-1200 um) | 319 | 0.41 | 5 | γ-Al₂O₃ γ-AlO(OH) (boehmite) κ-Al₂O₃ |  |
|  | 3 | 50-200 μm | 155 | 0.22 | 5 | α-Al₂O₃ (corundum) γ-Al₂O₃ |  |
| BASF | 4 | 14 × 28 mesh (600-1200 μm) | 329 | 0.38 | 5 | γ-Al₂O₃ γ-AlO(OH) (boehmite) κ-Al₂O₃ | d(1) = 432 d(10) = 726 d(50) = 1030 d(90) = 1400 d(99) = 1720 |
|  | 5 | 14 × 28 mesh (600-1200 μm) | 328 | 0.37 | 5 | α-Al(OH)₃ (bayerite) γ-Al₂O₃ α-Al₂O₃ (corundum) κ-Al₂O₃ γ-AlO(OH) (boehmite) | d(10) = 688 d(50) = 997 d(90) = 1390 |
| Huber | 6 | 300-1000 μm | 316 | 0.22 | 3 | γ-Al₂O₃ α-Al₂O₃ (corundum) κ-Al₂O₃ α-Al(OH)₃ (bayerite) γ-AlO(OH) (boehmite) | d(1) = 375 d(10) = 604 d(50) = 871 d(90) = 1210 d(99) = 1480 |
| BASF | 7 | 2-100 μm | 280 | 0.47 | 7 |  | d(1) = 2 d(10) = 5 d(50) = 22 d(90) = 52 d(99) = 83 |
| Sasol | 8 | 2-150 μm | 136 | 0.76 | 20 |  | d(1) = 2 d(10) = 5 d(50) = 26 d(90) = 76 d(99) = 144 |
| Sasol | 9 | 30-300 μm | 185 | 0.48 | 8 |  | d(1) = 38 d(10) = 59 d(50) = 88 d(90) = 138 d(99) = 282 |
| Axens | 10 | 240-1030 μm | 294 | 0.26 | 4 |  | d(1) = 244 d(10) = 381 d(50) = 568 d(90) = 809 d(99) = 1030 |
| Axens | 1 | 290-1430 μm | 304 | 0.37 | 5 |  | d(1) = 291 d(10) = 467 d(50) = 752 d(90) = 1130 d(99) = 1430 |
| Axens | 12 | 70-270 μm | 212 | 0.17 | 4 |  | d(1) = 68 d(10) = 86 d(50) = 120 d(90) = 172 d(99) = 268 |

[1]BJH and BET analyses were performed using a Micromeritics Gemini VII surface area analyser using nitrogen as the adsorbate at liquid nitrogen temperature. All samples were degassed at 60° C. under vacuum until a constant weight was achieved prior to analysis.
[2]Powder XRD measurements were carried out using a Bruker D8 ECO XRD machine using copper X-rays at 40 kV 25 mA and a solid state Si detector.
[3]Particle size distributions measured using laser diffraction on a Malvern Mastersizer 3000.

The BET method is applicable to adsorption isotherms of type II (disperse, nonporous or macroporous solids) and type IV (mesoporous solids, pore diameter between 2 nm and 50 nm). BET and full adsorption isotherms are routinely used to measure surface area, total pore volume, mesopore volume, area and distribution, and micropore distribution. Pores with widths exceeding about 50 nm (0.05 μm) are called macropores; pores of widths between 2 nm and 50 nm are called mesopores; pores with widths not exceeding about 2 nm are called micropores.

For materials having larger pore sizes, mercury intrusion porosimetry is recommended and covers the approximate range 3 nm to 600 μm (mesoporous to macroporous materials)—the larger size being dependent on the nature of the sample. Results provide porosity, pore size, pore area and pore volume. An alternative method for the determination of the total pore volume of a sample is by the combination of mercury pycnometry (bulk density measurement) and helium pycnometry (absolute density measurement).

Materials with a high proportion of mesopores (2-50 nm) are desired. The pores should be of sufficient size to accommodate the sorbent molecules used in the functionalisation derivatisation steps and remain sufficiently large post-functionalisation to capture the target contaminant molecules (e.g. PFAS molecules) with high capacity.

The class of large alumina particles can be broadly classified as having surface areas of 155-330 m²/g, with pore volumes 0.22-0.41 cm³/g and average pore sizes of 3-5 nm. The smaller class of alumina particles have surface areas of 136-280 m²/g, larger pore volumes 0.47-0.76 cm³/g and larger average pore sizes of 7-20 nm.

Example 1—Functionalisation and Derivatisation of Large Granular Alumina Particles Utilising Steps 1-3, (see Scheme 1 above) three families were exemplified on the alumina raw materials:

(1) Acyl derivatised PEI-substituted alumina
(2) Quaternised acyl PEI-substituted alumina
(3) Alkyl substituted PEI-substituted alumina

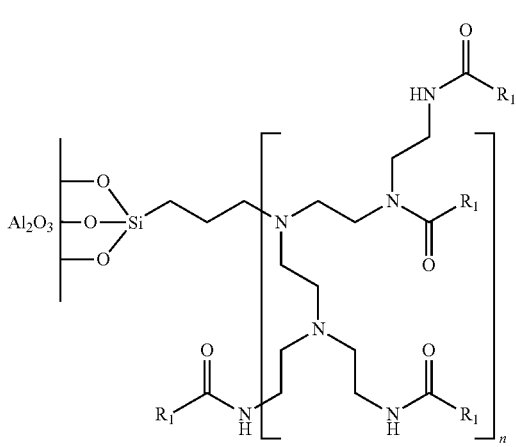

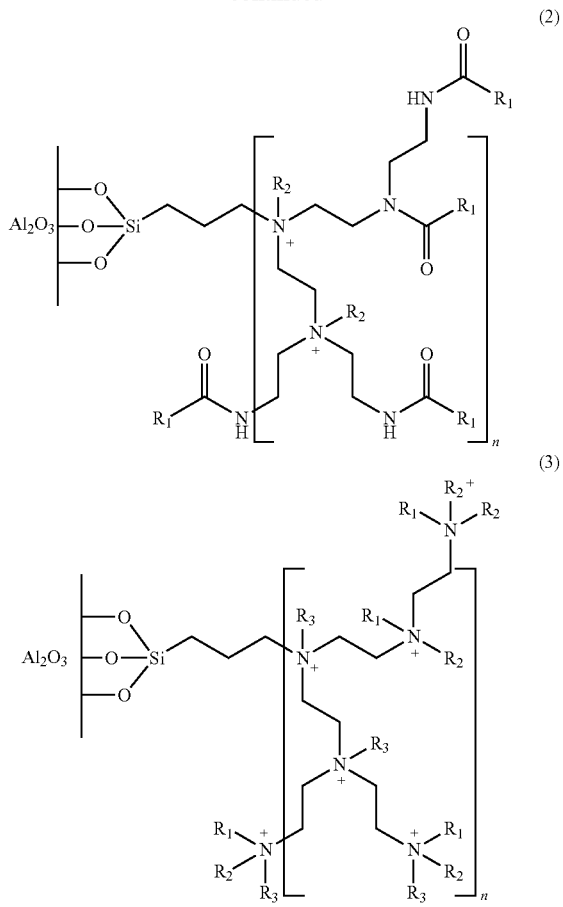

Family 1 Testing (Large Granular Alumina):

Batch test data for a family of materials is shown in FIG. 1. Alumina substrate characterisation data is displayed in Table 1 (above) and the characterisation data for functionalised materials is displayed in Table 2 (below). As shown in FIG. 1 the raw alumina material has modest PFAS removal properties for PFOS, which may be related to the mesoporous structure of the raw alumina. The batch test data below in FIG. 1 demonstrates that functionalisation of the alumina substrate results in improved PFAS removal properties versus the raw unfunctionalised alumina substrate and intermediate materials (PEI-alumina). The materials in FIG. 1 were prepared using 3-chloropropyltrimethoxysilane activation of alumina (Step 1, Scheme 1), 25 kDa PEI (Step 2, Scheme 1) and functionalised with octanoyl chloride (Step 3, Scheme 1).

Figure 2:
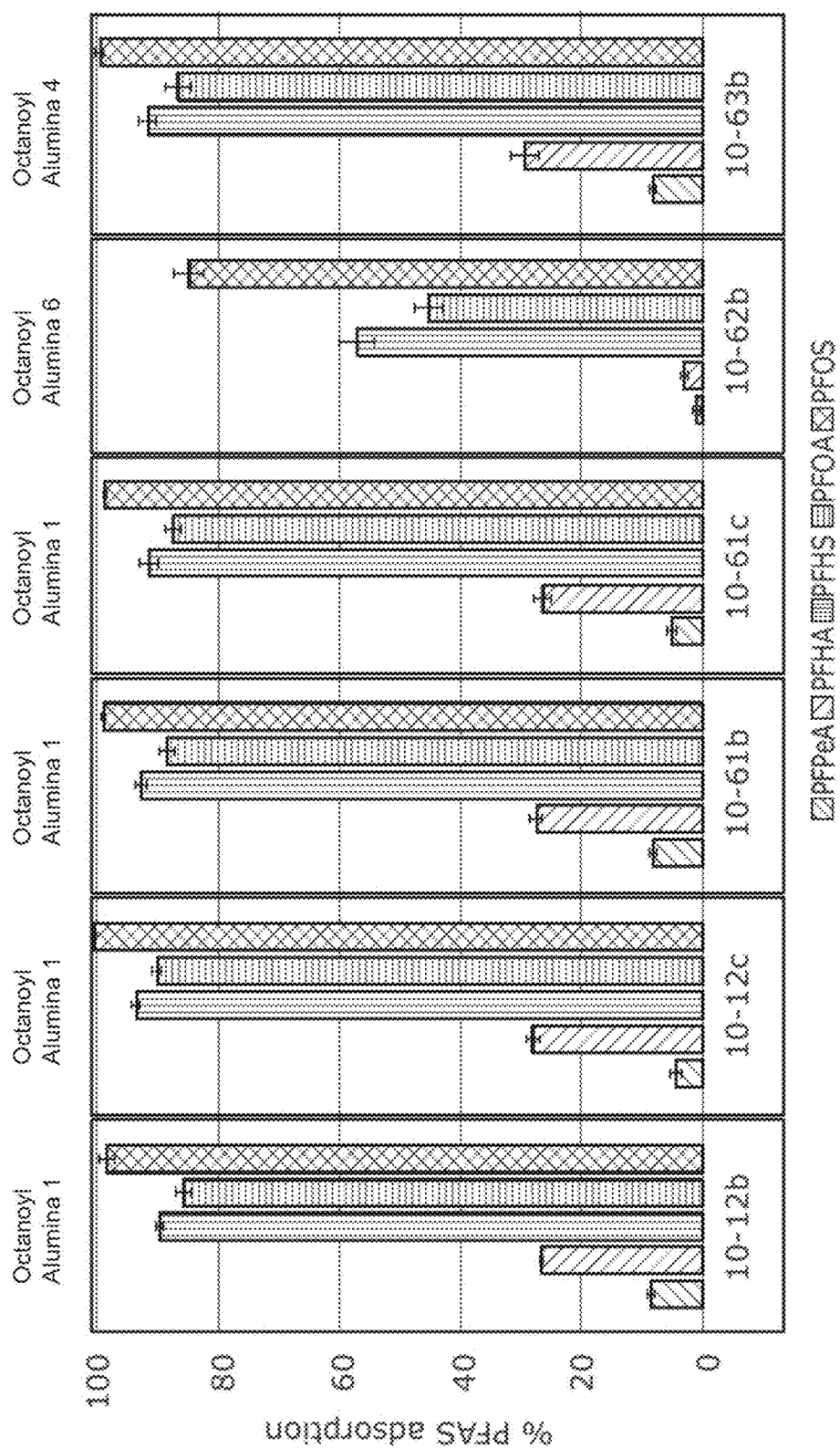
FIG. 2 shows a graph of a batch test for removal (% adsorption) of five different PFAS contaminants from water samples treated with octanoyl (C8 acyl) PEI-substituted for a range of different alumina substrates.

Within material family 1, different alumina substrates were trialled (alumina 1, alumina 4 and alumina 6) to demonstrate that the chemistry is applicable to several different alumina substrates. The batch test data is shown in FIG. 2. Characterisation of the unfunctionalised alumina substrates is given in Table 1 (above) and characterisation of the products are shown in Table 2 (below).

The PFAS removal performance was observed to follow the following trend with respect to alumina cores: 10-61b (alumina 1)>10-63b (alumina 4)>>10-62b (alumina 6). The poor PFAS removal performance (FIG. 2) of the 10-62b (alumina 6 core) versus 10-61b (alumina 1 core) and 10-63b (alumina 4 core) is believed to relate to the lower level of functionalisation—as determined by C and N elemental analyses (moieties capable of capturing PFAS) in the alumina 6 based material (see Table 2).

Although the three large granular alumina raw materials have similar surface areas (316-331 m²/g), the pore volume and average BJH pore sizes follow the trend: alumina 1 (0.40 cm³/g, 5 nm)>alumina 4 (0.38 cm³/g, 5 nm)>>alumina 6 (0.22 cm³/g, 3 nm). The optimised performance comes from the complimentary matching of the polymer and functionalisation with the pore size and pore volume of the alumina substrate.

Figure 3:
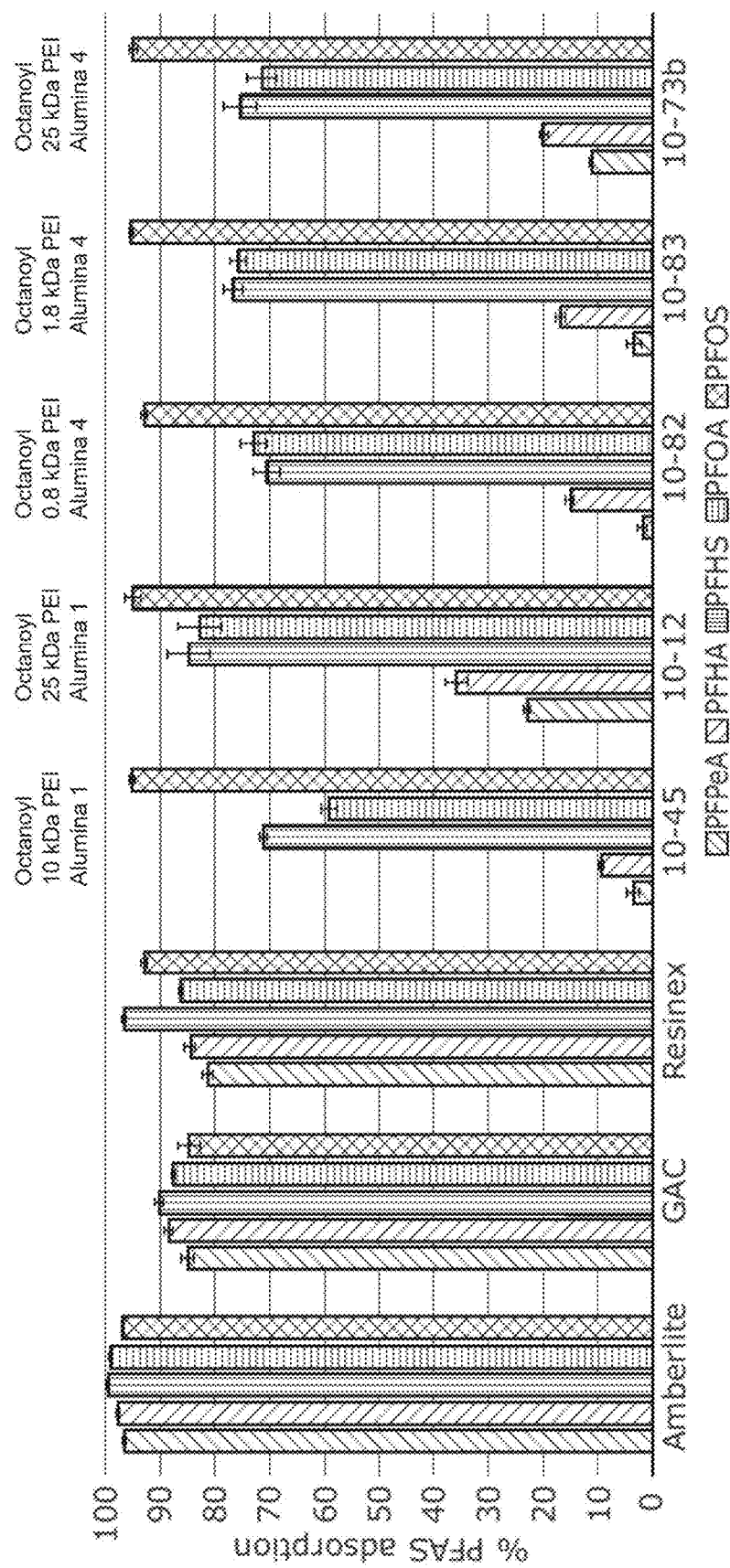
FIG. 3 shows a graph of a batch test for removal (% adsorption) of five different PFAS contaminants from water samples treated with granular activated carbon (GAC), Resinex and Amberlite ion exchange resins that represent comparators for existing known sorbent materials. Two different alumina substrate materials (alumina 1 and alumina 4) functionalised with core polymer, PEI, of different molecular weights are also tested.

The impact of the molecular weight of the PEI core polymer (Step 2, Scheme 1) was investigated on the two main alumina feedstocks (alumina 1 and alumina 4) within family 1. The batch test data is shown in FIG. 3. The data shows that PFAS removal performance on each alumina substrate tested gradually improves with increasing molecular weight of the PEI (up to weight average MW of 25 kDa), with the effect being more pronounced for the short-chain PFAS targets. Moreover, the performance of alumina 1 was better than alumina 4.

Figure 4:
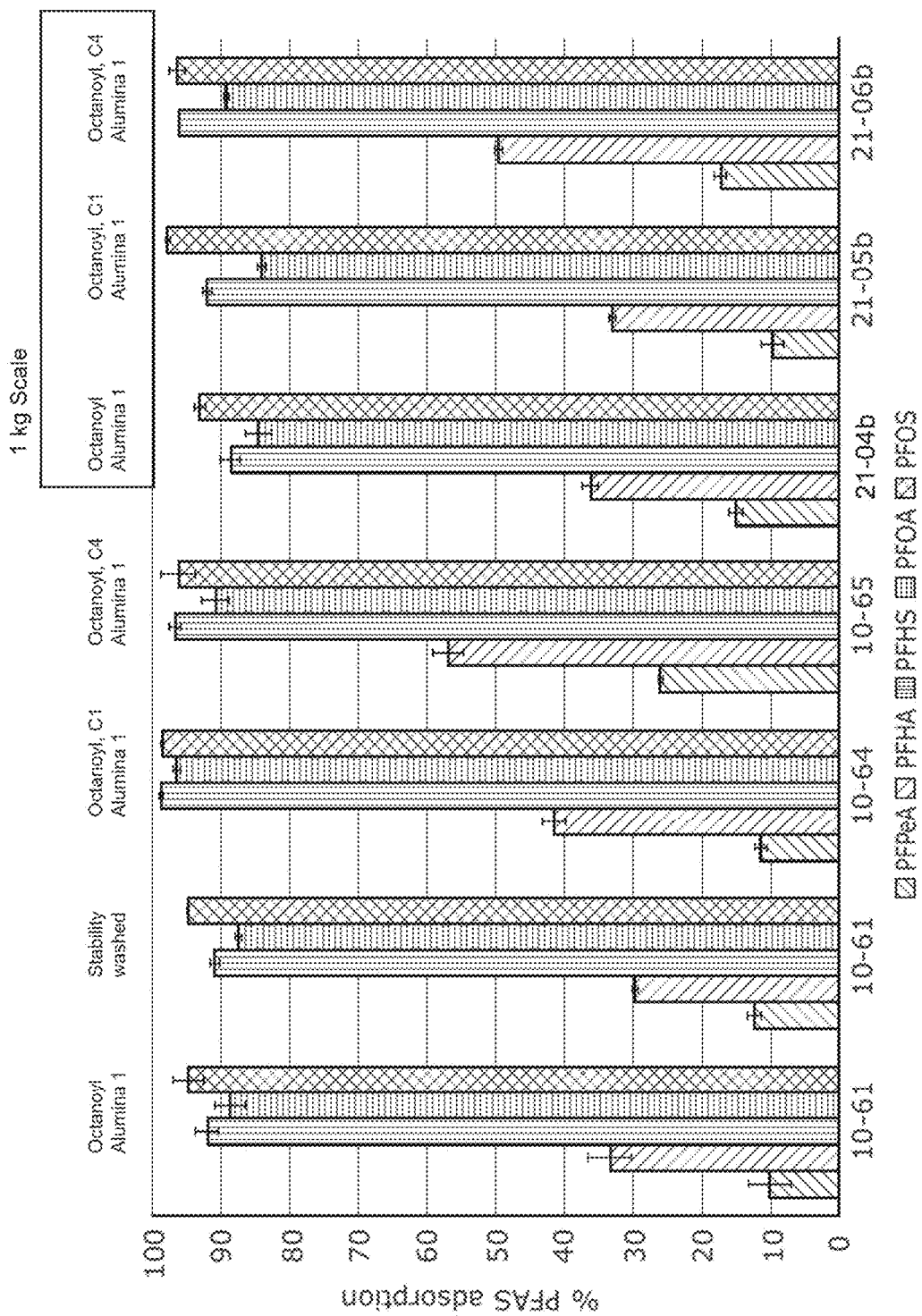
FIG. 4 shows a graph of a batch test for removal (% adsorption) of five different PFAS contaminants from water samples treated with alumina 1 functionalised with 25 kDa PEI core polymer and then further modified by addition of sorbent alkyl groups and quaternisation of tertiary amines.

Family 2 and 3 Testing (Large Granular Alumina):

The second and third family of materials made took the family 1 materials and introduced further levels of functionalisation via alkylation and quaternisation reactions of the sorbent molecule. The motivation for performing this chemistry was two-fold: (1) to introduce more alkyl chains, and (2) to introduce quaternary nitrogen centres within the core polymer. Both of these additional steps lead to a significant and unexpected improvement in PFAS removal versus the control materials functionalised with only an octanoyl side chain. The batch test data is presented in FIG. 4. Material characterisation data is displayed in Table 2 below.

The results show that by either reacting 10-61b (octanoyl substituted PEI-alumina 1) with iodomethane or iodobutane to yield 10-64b and 10-65b respectively, a further improvement in the short-chain PFAS removal is seen. To demonstrate the scalability of these results 21-04b (same chemistry as 10-61b) was prepared at the 1.2 kg scale and also reacted with iodomethane (21-05b) or iodobutane (21-06b). Hence, alkylation of the octanoyl substituted PEI-alumina material (10-61b) results in an increase in removal of the short chain PFAS. Also, reaction of the octanoyl substituted PEI-alumina material (10-61b) with iodobutane (10-65b) results in improved short-chain PFAS removal versus reaction of acyl substituted PEI-alumina materials with iodomethane (10-64b).

Figure 5:
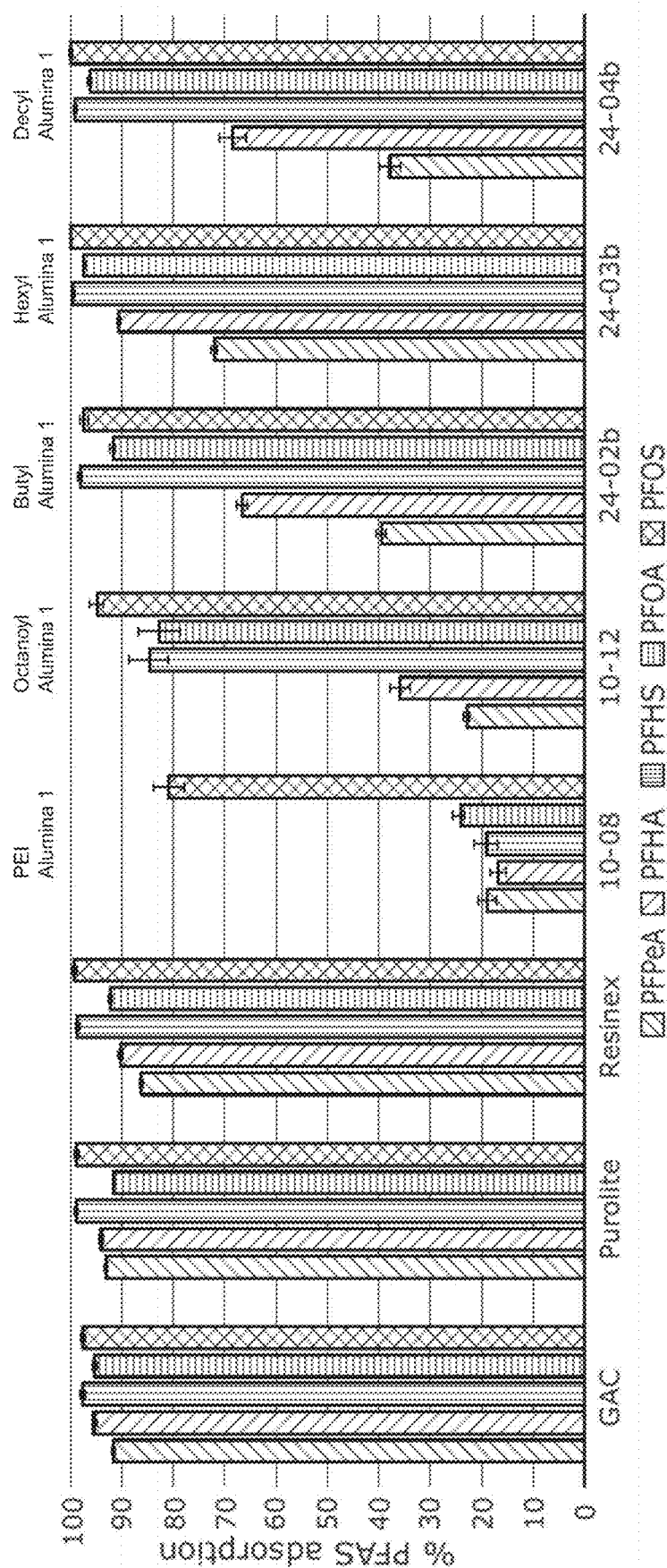
FIG. 5 shows a graph of a batch test for removal (% adsorption) of five different PFAS contaminants from water samples treated with granular activated carbon (GAC), Resinex and Purolite that represent comparators for existing known sorbent materials. An alumina substrate material (alumina 1 of FIG. 3) is functionalised with core polymer, PEI 25 kDa (Al-PEI) as a comparator, and then further modified by addition of sorbent alkyl groups of different lengths: C8 (Acyl PEI-sub Al), C4 (butyl), C6 (hexyl) and C10 (decyl).
Figure 6:
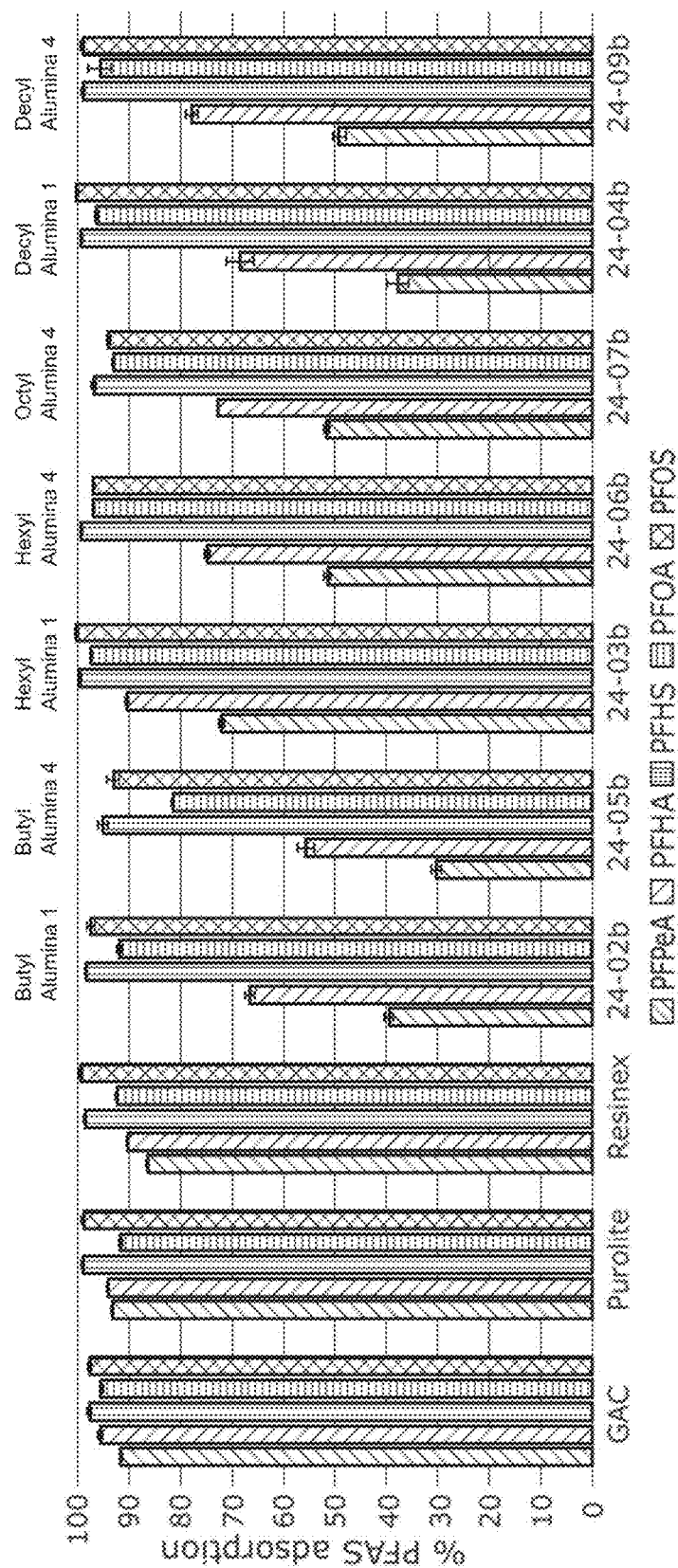
FIG. 6 shows a graph of a batch test for removal (% adsorption) of five different PFAS contaminants from water samples treated with granular activated carbon (GAC), Resinex and Purolite that represent comparators for existing known sorbent materials. Two different alumina substrate materials (alumina 1 and alumina 4) are functionalised with core polymer, PEI 25 kDa, and then further modified by addition of sorbent alkyl groups of different lengths.

Building upon the results from the family 2 materials, the key hypothesis was whether acylation (via the reaction of the PEI-alumina with octanoyl chloride) would provide for effective PFAS removal. A simple alkylation with an excess of an alkyl halide had already been shown to generate materials with superior all-round PFAS removal properties. The impact of alkylating reagent chain-length was first investigated from C4-C10 within the family of butyl, hexyl, and decyl investigated for alumina 1. The batch test data is shown in FIG. 5 and characterisation data displayed in Table 2 (below). The impact of alkylating reagent chain-length was also investigated for alumina 4. The batch test data is shown in FIG. 6 and compared with the data from alumina 1 (where applicable). Characterisation data is given in Table 2 below.

The results of these experiments show that the best performing materials from the two families (alumina 1 and alumina 4) based on a PEI core show that the hexyl chain length is optimum for removal of the particular PFAS that were tested. The results also show the influence both of chain length and the degree of functionalisation achievable on a porous substrate, and their impact on PFAS removal performance, is highly dependent upon the porosity (pore volume and pore size) of the starting substrate. It will be appreciated that the choice of optimal sorbent group may differ for other PEAS or target substances tested. Nevertheless, the results demonstrate the underlying principle of synergy between substrate material choice and sorbent molecule functionalisation in improving target substance removal.

Figure 7:
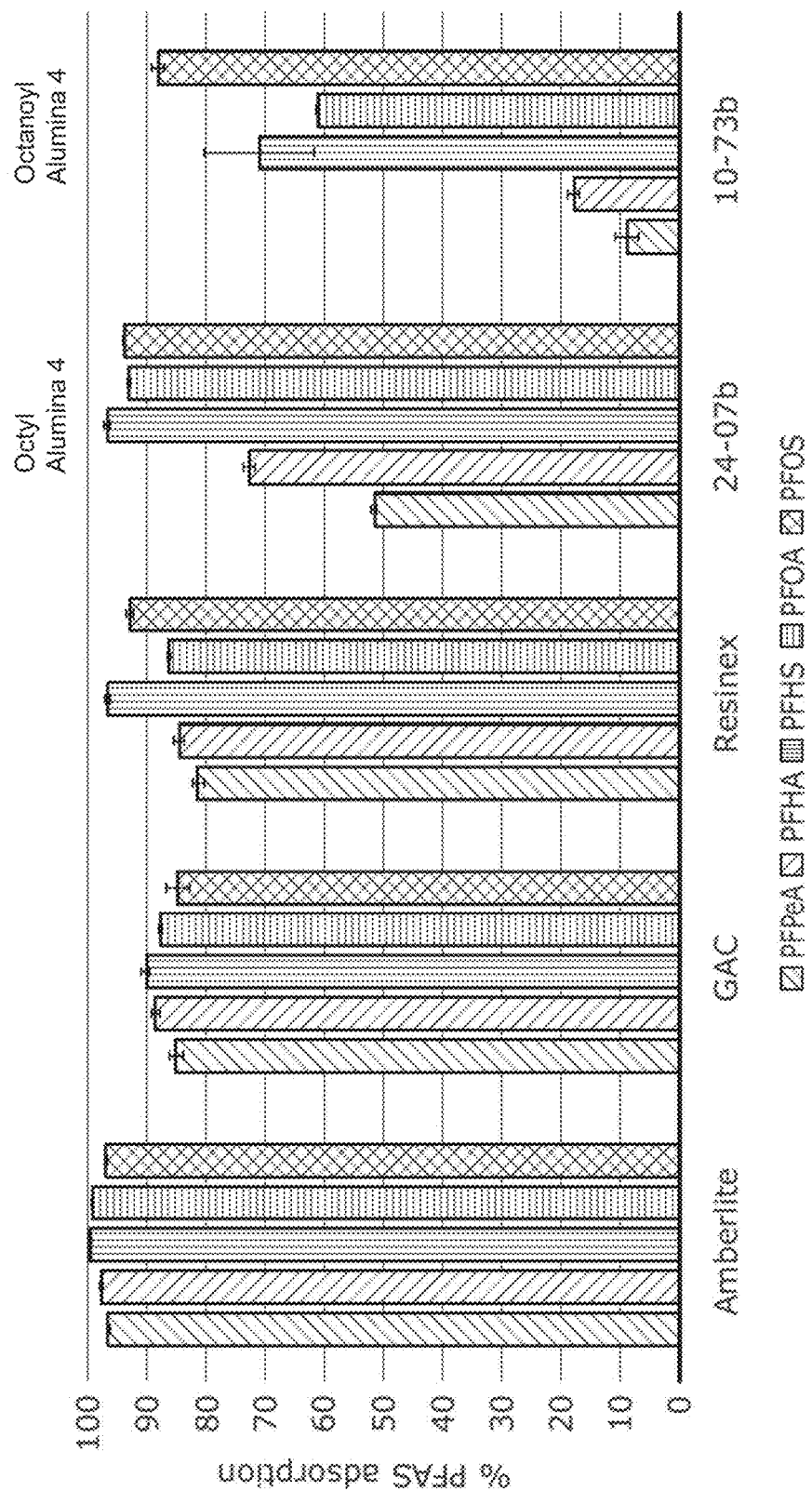
FIG. 7 shows a graph of a batch test for removal (% adsorption) of five different PFAS contaminants from water samples treated with granular activated carbon (GAC), Resinex and Amberlite that represent comparators for existing known sorbent materials. A family 1 material according to an embodiment of the invention, octanoyl PEI-substituted alumina 2 (10-73b), is compared to a family 3 material of another embodiment of the invention, octyl PEI-substituted alumina 2 (24-07b).

FIG. 7 compares the PFAS removal performance of the octanoyl PEI-substituted alumina 4 (10-73b) with the octyl PEI-substituted alumina 4 (24-07b). Both chemistries install a C8 side chain onto the PEI core polymer backbone. Characterisation data is given in Table 2 below. The batch test data in FIG. 7 shows that the 24-07b material has superior broad spectrum short-chain and long-chain PEAS removal properties compared to 10-73b.

TABLE 2

Characterisation of representative materials made from Families 1-3

| Material | Raw alumina | Family | Silane/ mmol (Step 1) | PEI (Step 2) | Chemistry (Step 3) | C (wt %) | N (wt %) | C:N ratio |
|---|---|---|---|---|---|---|---|---|
| Raw material | Alumina 1 | | n/a | | | | | |
| Raw material | Alumina 4 | | n/a | | | | | |
| Raw material | Alumina 6 | | n/a | | | | | |
| 10-08 | Alumina 1 | 1 | 0.15 | 25 kDa | | 2.6 | 1.3 | 2.0:1 |
| 10-10 | Alumina 1 | 1 | 1.5 | 25 kDa | | 4.2 | 1.2 | 3.5:1 |
| 10-12 | Alumina 1 | 1 | 0.15 | 25 kDa | C8 acyl | 6.3 | 1.3 | 4.8:1 |
| 10-13 | Alumina 1 | 1 | 1.5 | 25 kDa | C8 acyl | 8.4 | 1.5 | 5.6:1 |
| 10-73b | Alumina 4 | 1 | 0.15 | 25 kDa | C8 acyl | 5.7 | 1.5 | 3.7:1 |
| 10-61 | Alumina 1 | 1 | 0.15 | 25 kDa | C8 acyl | 6.2 | 1.7 | 3.7:1 |
| 10-62 | Alumina 6 | 1 | 0.15 | 25 kDa | C8 acyl | 4.2 | 1.0 | 4.2:1 |
| 10-64 | Alumina 1 | 2 | 0.15 | 25 kDa | C8 acyl, C1 | 5.9 | 1.7 | 3.2:1 |
| 10-65 | Alumina 1 | 2 | 0.15 | 25 kDa | C8 acyl, C4 | 6.7 | 1 | 3.6:1 |
| 10-45 | Alumina 1 | 1 | 0.15 | 10 kDa | C8 acyl | 6.5 | 1.9 | 3.5:1 |
| 10-82 | Alumina 4 | 1 | 0.15 | 0.8 kDa | C8 acyl | 4.8 | 1.0 | 4.6:1 |
| 10-83 | Alumina 4 | 1 | 0.15 | 1.8 kDa | C8 acyl | 6.1 | 1.5 | 4.1:1 |
| 21-04b | Alumina 1 | 1 | 0.15 | 25 kDa | C8 acyl | 6.9 | 1.7 | 4.0:1 |
| 21-05b | Alumina 1 | 1 | 0.15 | 25 kDa | C8 acyl, C1 | 5.8 | 1.7 | 3.4:1 |
| 21-06b | Alumina 1 | 1 | 0.15 | 25 kDa | C8 acyl, C4 | 6.0 | 1.7 | 3.5:1 |
| 24-01b | Alumina 1 | 3 | 0.15 | 25 kDa | C1 | 2.3 | 1.1 | 2.2:1 |
| 24-02b | Alumina 1 | 3 | 0.15 | 25 kDa | C4 | 4.8 | 1.5 | 3.3:1 |
| 24-03b | Alumina 1 | 3 | 0.15 | 25 kDa | C6 | 5.9 | 1.7 | 3.5:1 |
| 24-04b | Alumina 1 | 3 | 0.15 | 25 kDa | C10 | 6.6 | 2.0 | 3.3:1 |
| 24-05b | Alumina 4 | 3 | 0.15 | 25 kDa | C4 | 3.7 | 1.3 | 2.8:1 |
| 24-06b | Alumina 4 | 3 | 0.15 | 25 kDa | C6 | 4.3 | 1.4 | 3.1:1 |
| 24-07b | Alumina 4 | 3 | 0.15 | 25 kDa | C8 | 4.5 | 1.3 | 3.5:1 |
| 24-09b | Alumina 4 | 3 | 0.15 | 25 kDa | C10 | 4.8 | 1.2 | 4.0:1 |

Example 2—Functionalisation and Derivatisation of Small Granular Alumina Particles Three commercial raw alumina materials (d50<100 micron) were chosen (see Table 1 above and Table 3 below) for functionalisation. A comparative example of a large granular alumina particle (alumina 4) is given.

TABLE 3

Smaller particle-sized alumina materials used for functionalisation

| Name | Surface Area (m²/g) | BJH pore size (nm) | Pore volume (cm³/g) | Particle size d50 (micron) |
|---|---|---|---|---|
| Alumina 4* | 329 | 5 | 0.38 | 828 |
| Alumina 7 | 280 | 7 | 0.47 | 22 |
| Alumina 8 | 136 | 20 | 0.76 | 26 |
| Alumina 9 | 185 | 8 | 0.48 | 88 |

*Properties of larger alumina 4 grade feedstock included for comparison

The raw alumina feedstocks were surface functionalised using the 3-step process that was developed for the large alumina (Scheme 1) family 3 (see above) and summarised below as Scheme 2. The materials exemplified in this work (28-4a, 28-4b, 28-4c) employed iodohexane in the final functionalisation step (Scheme 2, Step 3). However, it should be appreciated that the scope of functionalisation is not limited to iodohexane, other haloalkanes (C4-C12) may also be employed, such as exemplified for alumina 1 and alumina 4 (above).

Scheme 2: Synthesis of the functionalised alumina substrate (any counter ions omitted for clarity).

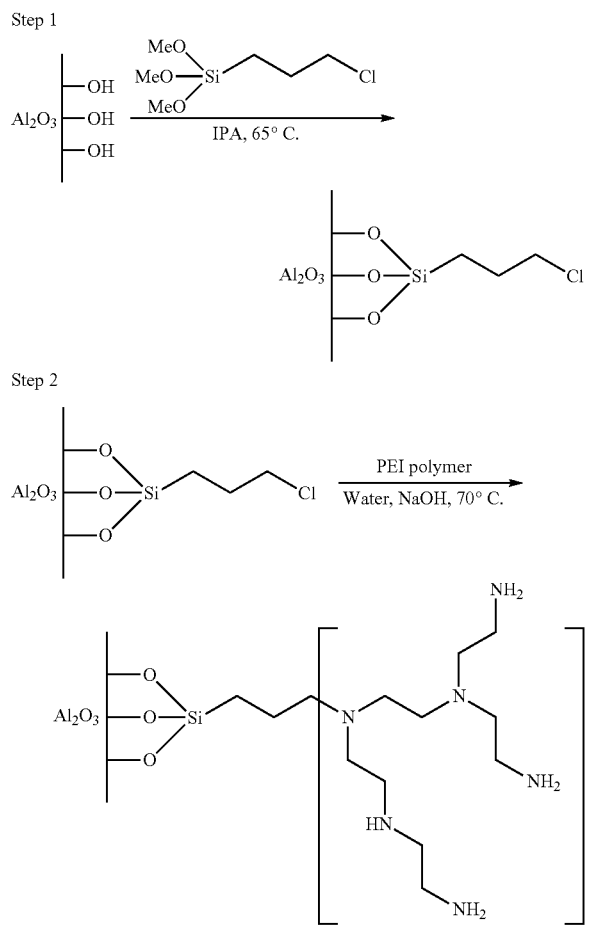

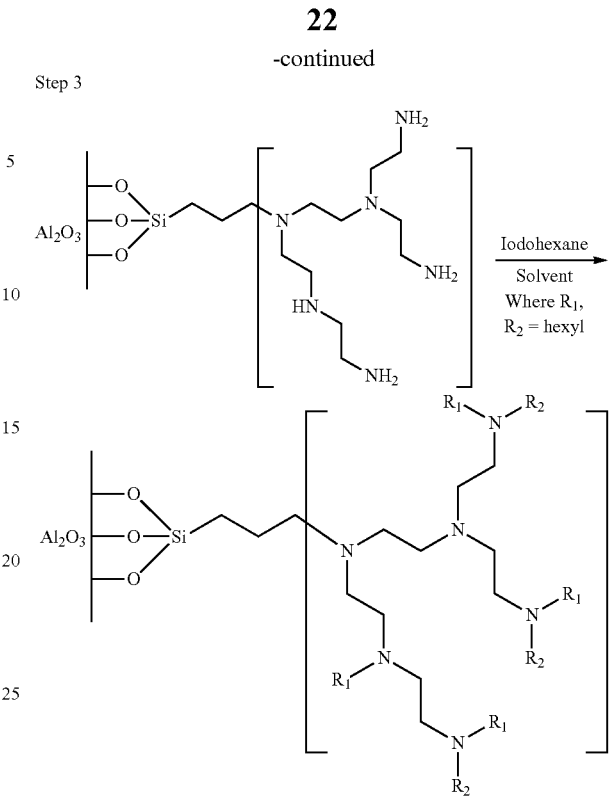

The analytical data for the 3 fully functionalised alumina materials (28-4a, 28-4b, 28-4c) is shown in Table 4 below. For reference, the best performing (by PFAS removal) larger particle-sized alumina 24-06b—which has the same hexyl surface functionalisation chemistry—is included.

TABLE 4

Analytical data for functionalised small alumina particles

| Material | Raw alumina | Surface Area (m²/g) | BJH pore size (nm) | Pore volume (cm³/g) | Particle size d50 (micron) | C (wt %) | N (wt %) | C:N ratio |
|---|---|---|---|---|---|---|---|---|
| 24-06b | 4* | 225 | 5 | 0.28 | 828 | 4.3 | 1.4 | 3:1 |
| 28-4a | 7 | 191 | 6 | 0.30 | 29 | 6.6 | 1.7 | 4:1 |
| 28-4b | 8 | 87 | 16 | 0.45 | 44 | 14.4 | 3.7 | 4:1 |
| 28-4c | 9 | 149 | 7 | 0.33 | 73 | 9.6 | 2.1 | 4.5:1 |

*Properties of 24-06b—larger functionalised alumina 4 feedstock included for comparison.

It should be noted that:
- The smaller alumina feedstocks (Table 3) compared to the larger alumina 4 substrate have significantly larger average pore sizes (7-20 nm versus 5 nm) and pore volumes (0.47-0.76 cm³/g versus 0.38 cm³/g).
- There is substantially more functionalisation on the surface of the smaller functionalised alumina adsorbent media versus the larger one as judged by the carbon and nitrogen contents (see Table 4) and confirmed by FTIR analysis (not shown).
- The carbon to nitrogen ratio is larger for the smaller alumina adsorbent media versus the larger one (ca. 4-4.5:1 versus 3:1). This suggests that the polyethyleneimine (PEI) backbone nitrogen atoms in the smaller adsorbent media may have a higher degree of alkylation.
- Upon functionalisation of the alumina substrates (Table 4) the percentage of pore volume reduction is greater for the smaller alumina adsorbent media than the larger granular media (31-41% versus 26%).

The elemental analyses and porosity analyses confirm that the smaller alumina adsorbent media have a higher degree of surface functionalisation than the larger 24-06b material. There is a positive correlation between level of functionalisation and pore diameter and, in fact, an inversely proportional relationship with surface area as determined by BET. This was unexpected, it would typically be assumed that surface area was the primary contributing factor, however, the present data now shows that the pore size of the substrate material is an important feature that contributes to the properties of the sorbent compositions of the invention. Predominantly mesoporous substrate materials, particularly those with an average pore size of greater than around 4 nm are particularly suited for PFAS removal from water.

Figure 8:
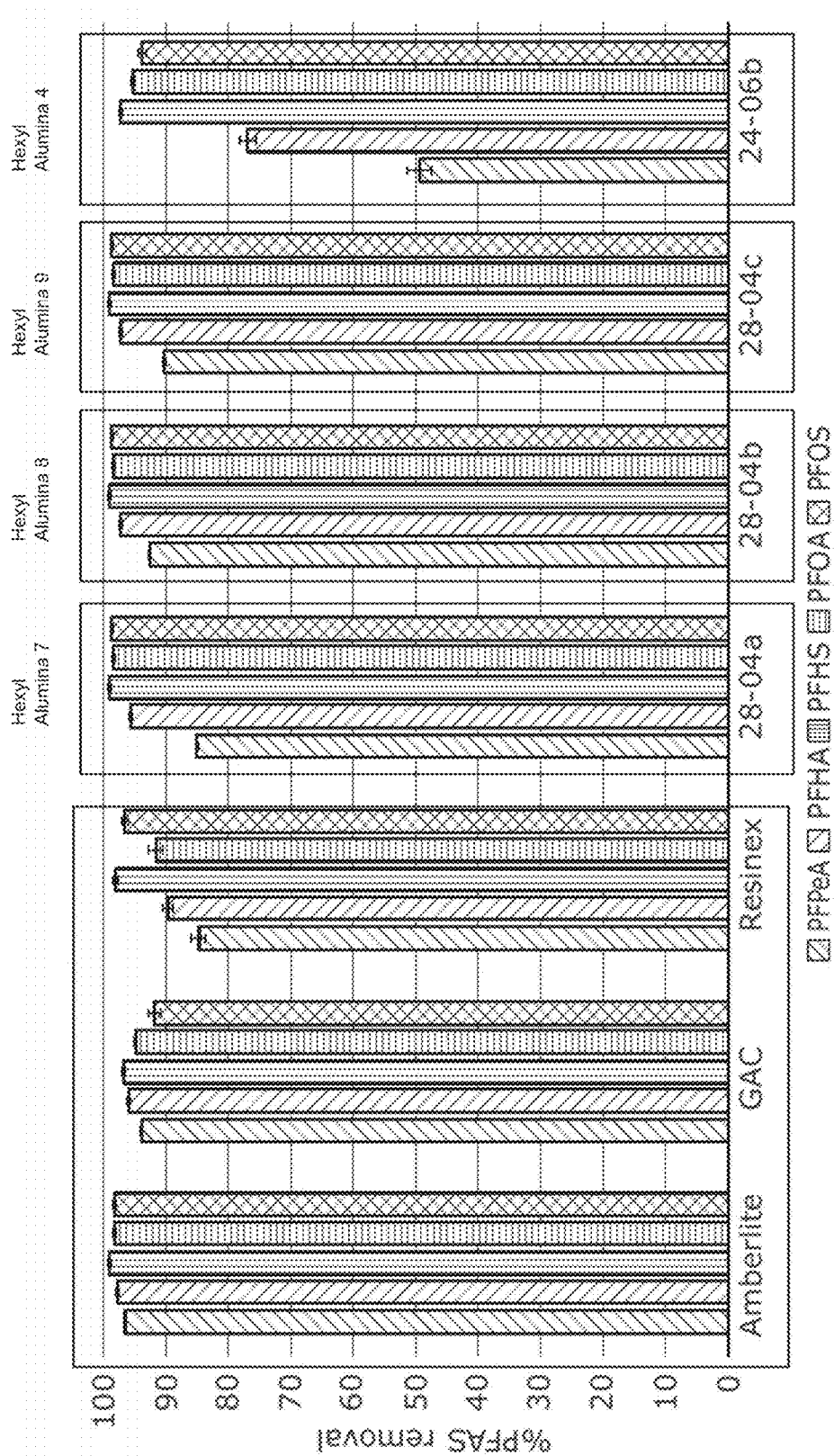
FIG. 8 shows a graph of a batch test for removal (% adsorption) of five different PFAS contaminants from water samples treated with granular activated carbon (GAC), Resinex and Amberlite that represent comparators for existing known sorbent materials. Using a range of alumina substrates, four test compositions of embodiments of the invention are also tested.

The initial PFAS removal performance properties of the new smaller adsorbent materials were investigated in a 24 h batch test as performed previously. FIG. 8 shows the batch test data for the new compositions (28-4a, 28-4b, 28-4c) in comparison to 24-06b and reference compositions of GAC and conventional ion exchange resins (Amberlite and Resinex).

Isotherm Data

Figure 9:
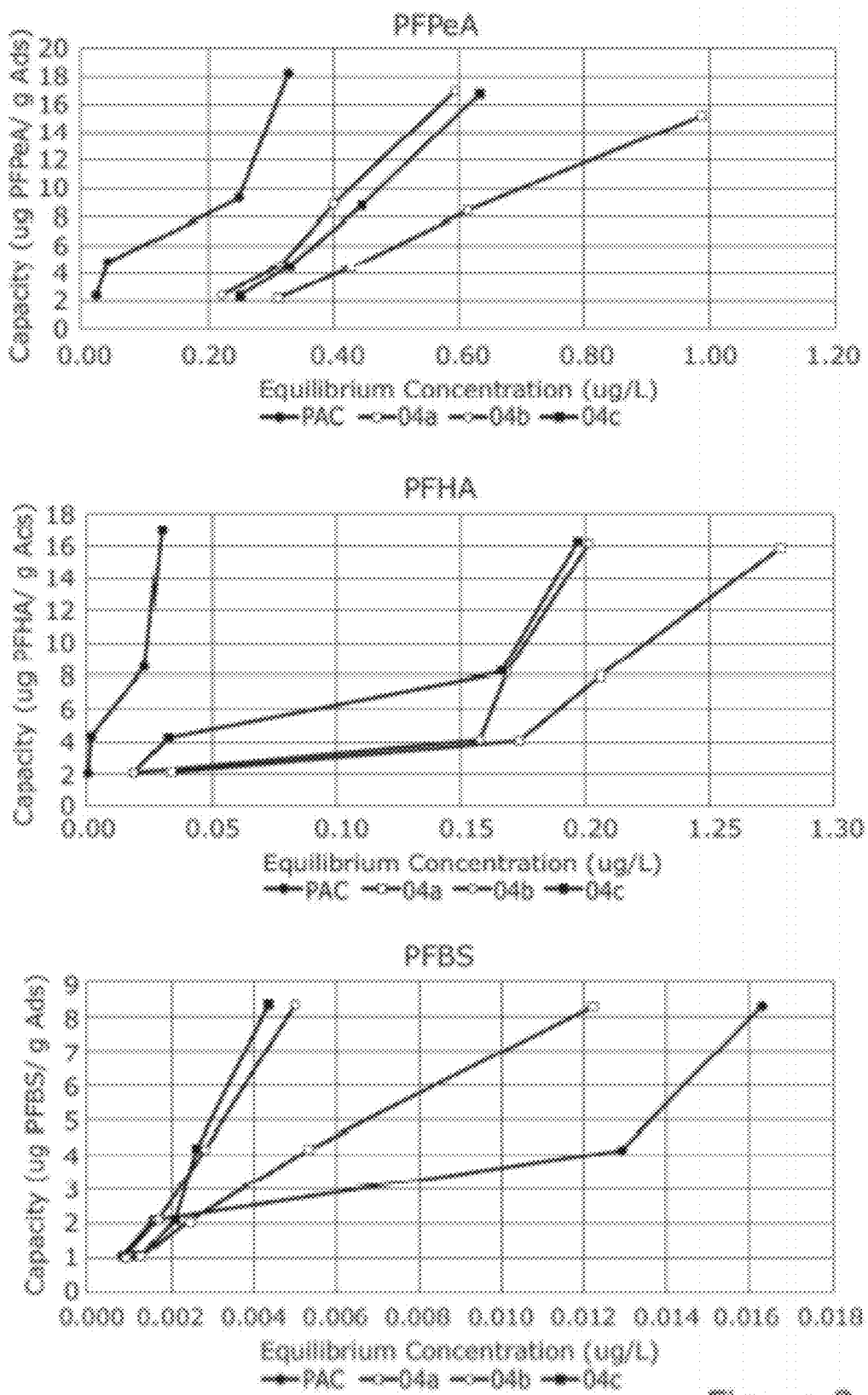
FIG. 9 shows isotherm plots for the three best performing embodiments of FIG. 8 small alumina adsorbent media (28-4a-4c) benchmarked against PAC (powdered activated carbon) for six PFAS contaminants.
Figure 9:
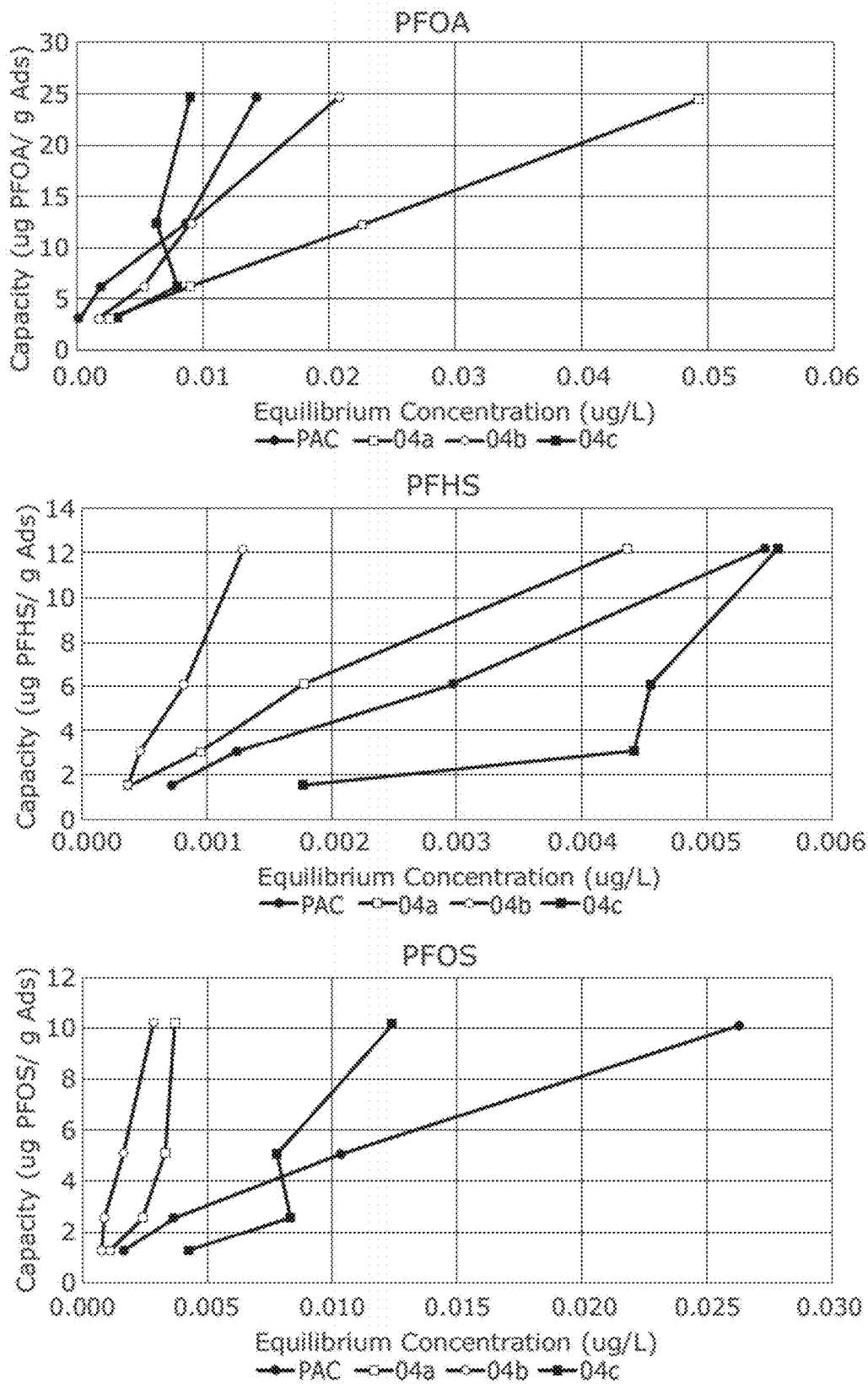

Isotherm batch tests were performed to understand the capacity of removal for the new adsorbent media (28-4a, 28-4b, 28-4c). Representative plots are shown in FIG. 9 benchmarked against powdered activated carbon (PAC) for six different PFAS substances.

Table 5 shows the comparative performance of the new materials versus a small particle activated carbon material for PFAS removal capacities.

TABLE 5

PFAS removal performance of small alumina versus PAC and GAC

| PFAS substance | Order of material sorbent capacity |
|---|---|
| PFBS | Small alumina = PAC >> GAC |
| PFPeA | PAC > small alumina >> GAC |
| PFHA | PAC > small alumina >> GAC |
| PFHS | Small alumina > PAC >> GAC |
| PFOA | Small alumina = PAC >> GAC |
| PFOS | Small alumina > PAC >> GAC |

The best performing small alumina material in these tests is 28-4b, which may be related to the high level of functionalisation of the surface of the particles.

Materials and Methods

Silanisation reactions (Step 1, Schemes 1 and 2). 50 g alumina was added to 2-propanol (150 mL) and 3-chloropropyltrimethoxy silane (1.4 mL). The suspension was stirred using an overhead stirrer at ~150 rpm for 24 h at 65° C. The material was then washed with 2-propanol (3×150 mL) before being dried under vacuum at 80° C. for 3 h. The materials were then dried further at 40° C. under vacuum.

PEI reactions (Step 2, Schemes 1 and 2) were performed at the 30 g scale. 30 g of the dried silanized product was added to a solution consisting of PEI (e.g. MW=25 kDa, 9 g) and DI water (150 mL). This was heated to 70° C. for 24 h whilst being stirred at ~150 rpm. 10 M NaOH (5×90 µL portions in total) were added at 30 min, 1.5 h, 2.5 h, 3.5 h and 4.5 h. The materials were then washed using water (2×150 mL) adjusted to pH 4 using HCl, DI water (150 mL), 0.1 M aqueous potassium carbonate (2×150 mL) and DI water (2×150 mL) before being dried under vacuum at 40° C.

Acylation reactions (Step 3, Scheme 1) were performed at the 40-80 g scale. The aminated product (40 g) was added carefully to octanoyl chloride (20.4 mL=3 mmol/g of PEI-substituted alumina) in dry acetonitrile (120 mL). The suspension was stirred at 25° C. for 5 h. The materials were carefully washed at 50° C. with 2-propanol (4×50 mL), then with DI water at 50° C. (4×50 mL) and finally with 0.1 M aqueous potassium carbonate (250 mL) for 1 h. The final product was filtered, washed with water (100 mL) and dried under vacuum at 40° C. overnight.

Alkylation reactions (Step 3, Schemes 1 and 2) were performed at the 15 g scale. 15 g of aminated product was added to a suspension consisting of potassium carbonate (14.9 g) and 2-propanol (45 mL). 1-Iodohexane (13.28 mL) was added and the suspension stirred at 80° C. overnight. The materials were then washed at 50° C. using 2-propanol (4×50 mL), 0.1 M aqueous potassium carbonate (2×50 mL) and DI water (2×50 mL). The final product was dried under vacuum at 40° C. overnight. To purify the functionalised materials, the final product was divided between two 50 mL falcon tubes. 45 mL DI water was added to each and left to shake for 30 minutes before being centrifuged. The water was then removed and analysed for TOC, TN and aluminium content. A further 45 mL of DI water was then added to each falcon and the process repeated until a total of 8 washes had been performed.

Example 3—Membrane Encapsulated Filtration Device for Point-of-Use (POU) Applications Following successful tests in Examples 1 and 2 treating PFAS contaminated water, a membrane encapsulated absorbent structure (MEAS) filled with functionalised alumina as described in the present embodiments was tested with additional PFAS species specified in a provisional version of the updated NSF-53 industry standard protocol that further includes GenX. The MEAS included functionalised alumina composition located between porous metal foil supporting membranes.

Desired parameters for a typical POU device are set out in Table 6. These parameters are indicative of the requirements for a typical an under-sink cartridge, such as for domestic use.

TABLE 6

Typical Design Specifications for a POU Device

| Design Specification | Parameter Value or Range |
|---|---|
| Operational Pressure Range | 1.4 bar to 6.8 bar |
| Initial treatment flow rate | 3 L/min |
| Sufficient Contact Time | <10 seconds |
| Provisional Product Lifetime Target | Up to 12 months |
| Provisional Volume of Water to Treat | 5500 L |

Methodology

Operational Parameters

Two MEAS test cells were tested simultaneously, with alumina powder bed depths of 7 mm and 13 mm. The alumina powders loaded into these cells follow the same functionalisation procedure but are from different production batches. The 7 mm cell contained 20.1 g of powder, and the 13 mm cell 35.4 g.

A peristaltic pump was used to supply water at a flow rate of 150 mL/min. The flow rate was monitored periodically throughout the experiment and remained between 140 and 160 mL/min. The system was operated for approximately 8 h per day and was stagnant overnight.

TABLE 7

Operational Parameters for MEAS PFAS flow testing

| Parameter | Test Cell 1 | Test cell 2 |
|---|---|---|
| Bed Depth (mm) | 7 | 13 |
| Powder Mass (g) | 20.1 | 35.4 |
| Membrane Area (cm$^2$) | 36.8 | 36.8 |
| Flow Rate (mL/min) | 150 | 150 |
| Flux (L/h m$^2$) | 2440 | 2440 |
| Contact Time (s) | 10 | 19 |

A POU device which could treat 2 L/min at the current flux (2440 L/h m$^2$) would require a membrane surface area of 500 cm$^2$. Maintaining constant operational parameters as tested in the trial devices, the scale factor required is 13.3. This scale factor can be used to convert the volume of water treated by the Test Cells 1 and 2 to an equivalent volume of water treated by the full-scale device. Therefore, treatment of 200 L of water through the test devices is equivalent to 2670 L in a full-scale device.

Water Matrix and Sampling

The PFAS species used and their concentrations are presented in Table 8 below.

TABLE 8

Concentrations of PFAS species in the flow testing feed solution

| PFAS Species | GenX | PFHpA | PFOA | PFNA | PFHxS | IPFOS |
|---|---|---|---|---|---|---|
| Concentration (ppt) | 900 | 40 | 500 | 50 | 300 | 1000 |
| Regulatory Limit (ppt) | Not specified (135) | 20 | 20 | 6 | 30 | 20 |

The current NSF-53 protocol specifies that the water for testing should be from a public water supply with the specific characteristics set out in Table 9 maintained throughout.

TABLE 9

Water specifications for testing during NSF-53 Certification

| pH | 7.5 ± 0.5 |
|---|---|
| Temperature (° C.) | 20 ± 2.5 |
| Total dissolved solids 'TDS' (mg/L) | 200 to 500 |
| Total organic carbon 'TOC' (mg/L) | >1.0 |
| Turbidity (NTU) | <1 |

For initial testing purposes spiked de-ionised water was used instead of London mains tap water. The concentration of ions added to the water are presented in Table 10 below. This water fulfils the NSF criteria for pH and TOC. TOC was added as chlorinated tannic acid, as specified by the NSF protocol. The other ions were chosen to be representative of median concentrations for many common water matrix constituents. It should be noted that the current NSF-53 does not specify an upper limit for GenX, however, for the purposes of the current tests a recommended limit of 135 ppt has been assumed.

TABLE 10

Concentrations of water matrix constituents

| Ion | Concentration | Concentration Units |
|---|---|---|
| Na$^+$ | 103 | ppm |
| Ca$^{2+}$ | 50 | ppm |
| Mg$^{2+}$ | 10 | ppm |
| CO$_3^{2-}$ | 180 | ppm |
| SO$_4^{2-}$ | 70 | ppm |
| NO$_3-$ | 1 | ppm |
| Cl$^-$ | 118 | ppm |
| TOC | 1.4 | ppm |
| Adjusted pH | 7.5 | — |

Sampling Regime

Samples were taken from a port on the effluent line at 2 h intervals throughout the duration of the 70 h experiment. Sampling was more frequent during the first 2 h of the experiment.

Samples were sent weekly for PFAS quantification by LC-MS. The limit of detection of this technique is between 0.5 ppt and 2 ppt depending on the PFAS species. The limit of quantification is between 2 ppt and 7 ppt.

Results

Flow Control and Pressure Drop

Figure 10:
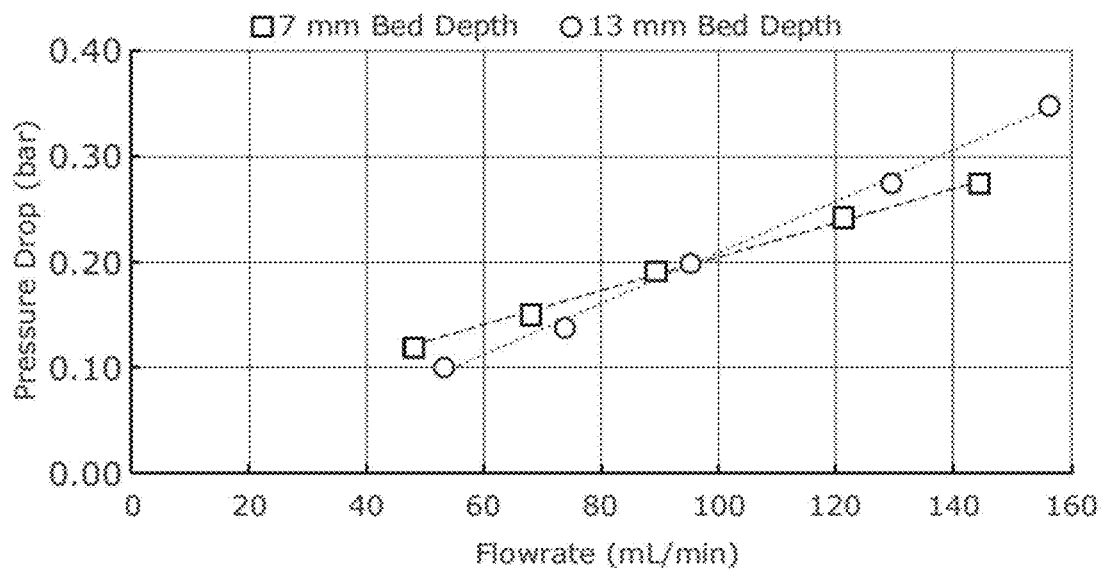
FIG. 10 shows a graph of pressure drop vs flow rate for 7 mm and 13 mm functionalised alumina depth membrane encapsulated adsorbent structure (MEAS) set-ups according to embodiments of the invention.

Before commencing PFAS flow testing, a graph of pressure drop versus flow rate was generated by varying pump speed. This data is presented in FIG. 10. The results are clearly linear, however the pressure drops are very similar despite one test cell having almost twice the depth of alumina powder.

The 7 mm and 13 mm test cells began the PFAS testing with inlet pressures of 0.2 bar and 0.325 bar respectively. This pressure increased steadily over the course of testing. After 150 L of water had passed through the system the pressure of both systems had risen to approximately 0.5 bar. After 300 L, the inlet pressure of both systems was 0.9 bar. At the end of the experiment, both systems had an inlet pressure above 1.2 bar.

The increase in inlet pressure over the course of the experiment is significant and approximately equal for both test cells. There were visible brown deposits on the feed side of the membrane.

Although the increase in inlet pressure cannot be attributed entirely to the presence of tannic acid from this experiment alone, the coloration of the deposits suggest tannic acid may be responsible.

PFAS Removal Performance for 7 mm Test Cell

Figure 11:
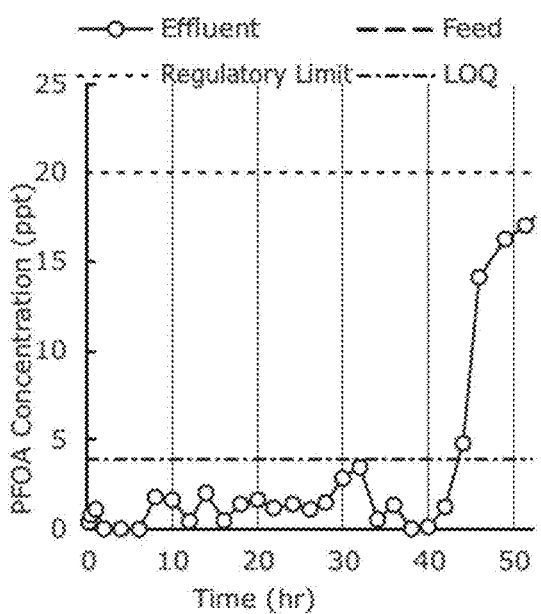
FIG. 11 shows a graph of a breakthrough curve for PFOA in water of the 7 mm MEAS device.

The concentration of PFOA in the effluent of the 7 mm cell first only started to rise sharply from 5 ppt to 15 ppt after 396 L of water were treated over a period of 44 h—see FIG. 11. This is equivalent to 5284 L of water when extrapolated to a full scale POU device. It is estimated that the average European uses around 20 L per day in their kitchen (Richter, C. P. and Stamminger, R. (2012). Water consumption in the kitchen—A case study in four European countries. Water Resource Management). Hence, it would be expected that a scaled-up version of the 7 mm cell could function reliably for over six months as a POU device, which is in full accordance with current industry standards.

Figure 12:
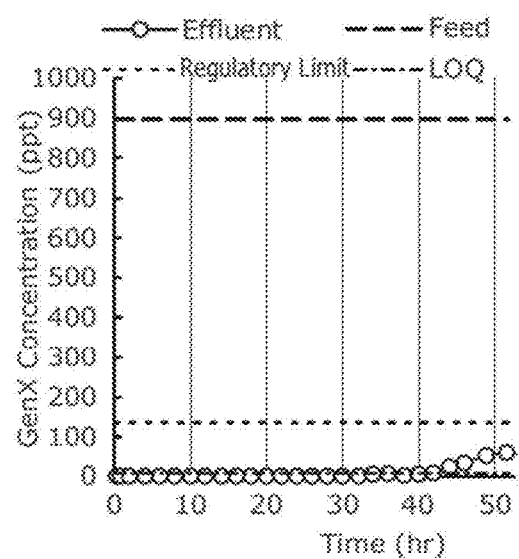
FIG. 12 shows a breakthrough curve for the PFAS GenX in water of the 7 mm MEAS device.

The concentration of GenX in the effluent of the 7 mm cell was first detected at a concentration of 6.6 ppt after 306 L of water were treated (34 h, 4080 L for the POU device)—see FIG. 12. After this point the concentration of GenX in the effluent of the 7 mm cell gradually increased, reaching a peak of 62 ppt after 464 L treated (51.5 h, 6184 L for the POU device). The final GenX concentration recorded was 50 ppt. The concentration of GenX never exceeded even half of the assumed limit of 135 ppt.

The concentration of PFOS in the effluent of the 7 mm cell sharply increased to 14 ppt after 414 L of water were treated (46 h, for the POU device). The concentration then remained between 12 ppt and 17 ppt for the remainder of the experiment, but it never exceeded the limit of 20 ppt.

PFHxS was first measured above the limit of quantification after 396 L of water were treated (44 h, 5284 L for the POU device). Beyond that point the concentration of PFHS increased from 4 ppt to 11 ppt. This is below the limit of 30 ppt for PFHS.

PFHpA and PFNA were first detected after 396 L of water were treated (44 h, for the POU device). PFHpA remained below its limit of quantification of 5 ppt, which is safely below its regulatory limit of 20 ppt. PFNA remained below its limit of quantification of 6 ppt, which is also its regulatory limit. Although exact concentrations cannot be calculated for PFNA throughout the run, the maximum peak area observed for PFNA throughout the experiment was around half the peak area for 6 ppt on the standard line.

PFAS Removal Performance for 13 mm Test Cell

The PFOA concentration in the effluent of the 13 mm test cell remained well below the regulatory limit of 20 ppt throughout the whole duration of the experiment. The amount of PFOA in the effluent never exceeded the limit of quantification (LOQ) of 4 ppt during the experiment. GenX was first detected in the effluent of the 13 mm cell above the limit of detection (LOD) but below the LOQ, after 396 L of water were treated (44 h, 5284 L for the POU device). The concentration of GenX rose from 8 ppt after 464 L of water was treated (51.5 h), to 27 ppt by the end of the experiment (69 h).

PFHpA and PFNA remained below the limit of detection throughout the experiment, aside from a few single points early on. PFHxS was detected around the limit of detection from 38 h (342 L treated). For the remainder of the experiment the amount of PFHxS never exceeded the LOQ of 2 ppt. PFOS was observed at the limit of detection from 61.5 h onwards (554 L treated). Treatment of this volume of water is equivalent to functioning for over a year when extrapolated to a full scale POU under-sink device.

Figure 13A:
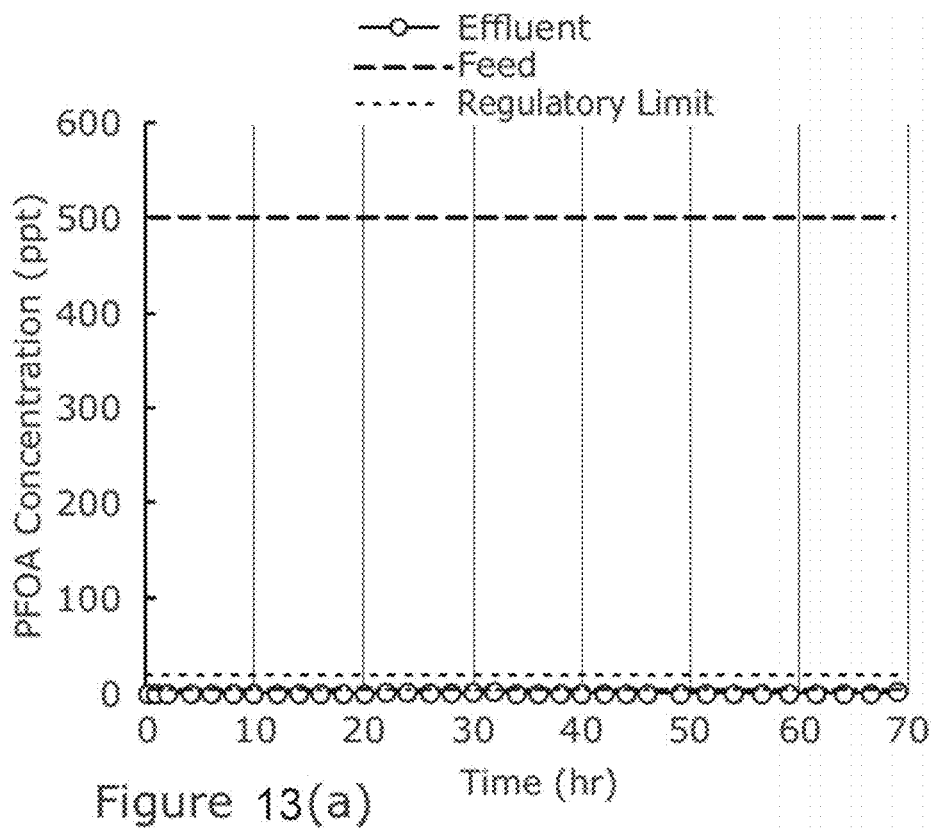
FIGS. 13(a)-13(b) show breakthrough curves for the 13 mm MEAS device for (FIG. 13(a)) PFOA and (FIG. 13(b)) GenX.
Figure 13B:
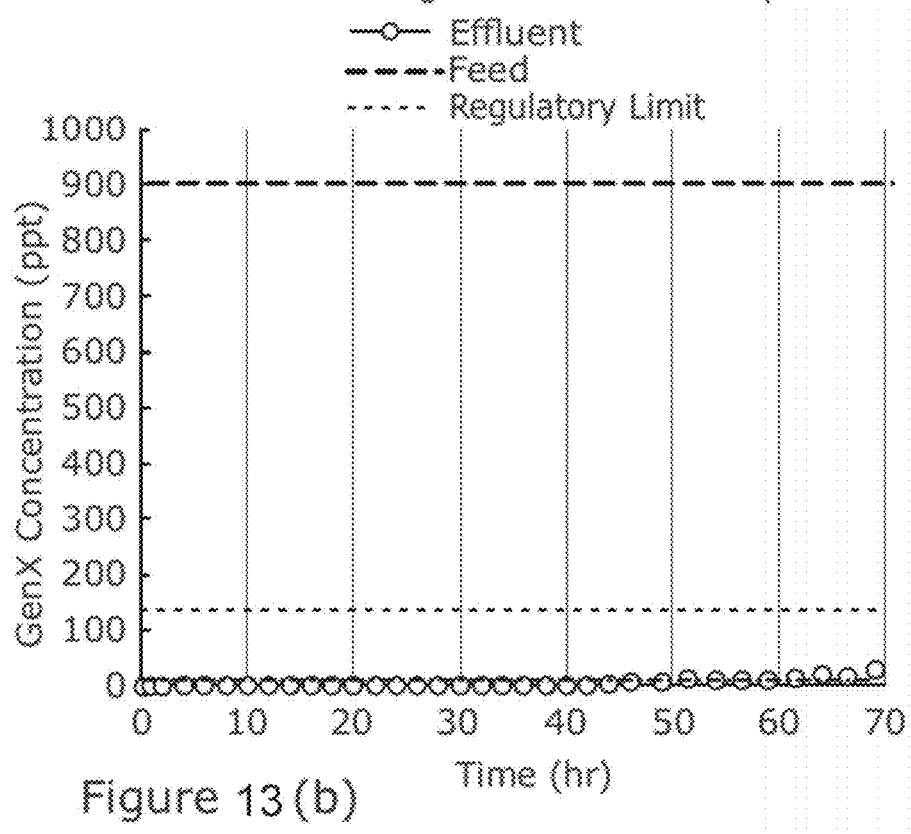

The breakthrough curves for PFOA and GenX are presented in FIG. 13 (α-b).

PFAS Capacity

The breakthrough results from the 7 mm cell allow the capacity of the alumina adsorbent powder to be estimated. By evaluating the inlet and effluent PFAS concentration for each species and multiplying the difference by the volume of water treated before breakthrough (554 L), a total mass of PFAS captured was calculated for each PFAS species. This was then divided by the mass of powder in the cell (20.1 g) to determine a capacity. The results are presented in Table 11 below.

TABLE 11

Capacity of functionalised alumina for PFAS species, based on breakthrough of PFOA with the 7 mm test cell

| PFAS Species | GenX | PFHpA | PFOA | PFNA | PFHS | PFOS |
|---|---|---|---|---|---|---|
| Inlet Concentration (µg/L) | 0.90 | 0.04 | 0.50 | 0.05 | 0.30 | 1.00 |
| Average Effluent Concentration (µg/L) | 0.014 | 0.001 | 0.006 | 0.001 | 0.003 | 0.004 |

TABLE 11-continued

Capacity of functionalised alumina for PFAS species, based on breakthrough of PFOA with the 7 mm test cell

| PFAS Species | GenX | PFHpA | PFOA | PFNA | PFHS | PFOS |
|---|---|---|---|---|---|---|
| PFAS Captured (µg) | 490.3 | 21.7 | 273.6 | 27.2 | 164.4 | 551.5 |
| PFAS Capacity (µg/g) | 24.4 | 1.1 | 13.6 | 1.4 | 8.2 | 27.4 |

CONCLUSIONS

PFAS adsorption tests, based around the NSF-53 guidelines including additional PFAS contaminants (GenX, PFHpA, PFNA, and PFHxS), were performed on Puraffinity media encapsulated in the MEAS device. The tests ran in parallel using 2 cells of different bed depths, 7 mm and 13 mm. The two cells had contact times of 10 and 19 s respectively, and loadings of 20.1 and 35.4 g of adsorbent powdered alumina media, and a flow rate of 150 mL/min in each.

In the 7 mm test cell after 44 h of sampling, there was a change in effluent concentration for most of the PFAS from undetectable to detectable limits. The most visible concentration change was of PFOA and PFOS which both increased from 5 to 16 ppt yet did not exceed 20 ppt. PFAS limits were not exceeded in the second, 13 mm bed-depth cell. The PFOA concentration in the effluent of the 13 mm cell remained well below the regulatory limit of 20 ppt for the duration of the experiment.

These trials have demonstrated the feasibility of the technology at a laboratory scale. The utility is also shown for a wide range of PFAS.

Example 4—Hexyl-PEI Functionalised Alumina 11 Using Iodohexane and Bromohexane

Alkylation using bromohexane (Step 3, Schemes 1 and 2) were performed at the 15 g scale. 15 g of aminated product was added to a suspension consisting of potassium carbonate (12.4 g) and 2-propanol (30 mL). 1-Bromohexane (25.35 mL) was added and the suspension stirred at 80° C. overnight.

The materials were then washed at 50° C. using 2-propanol (4×50 mL), and DI water (10×50 mL). The final product was dried under vacuum at 40° C. overnight. Table 12 provides an elemental analysis of the product compared to a functionalised alumina using iodohexane (see Example 2).

TABLE 12

Elemental analysis data for hexyl-PEI functionalised alumina 11 using iodohexane and bromohexane

| Material | Si (wt %) | C (wt %) | N (wt %) |
|---|---|---|---|
| Alumina 11 (Iodohexane) | 0.36 | 8.73 | 1.74 |
| Alumina 11 (Bromohexane) | 0.27 | 9.02 | 1.21 |

Figure 14:
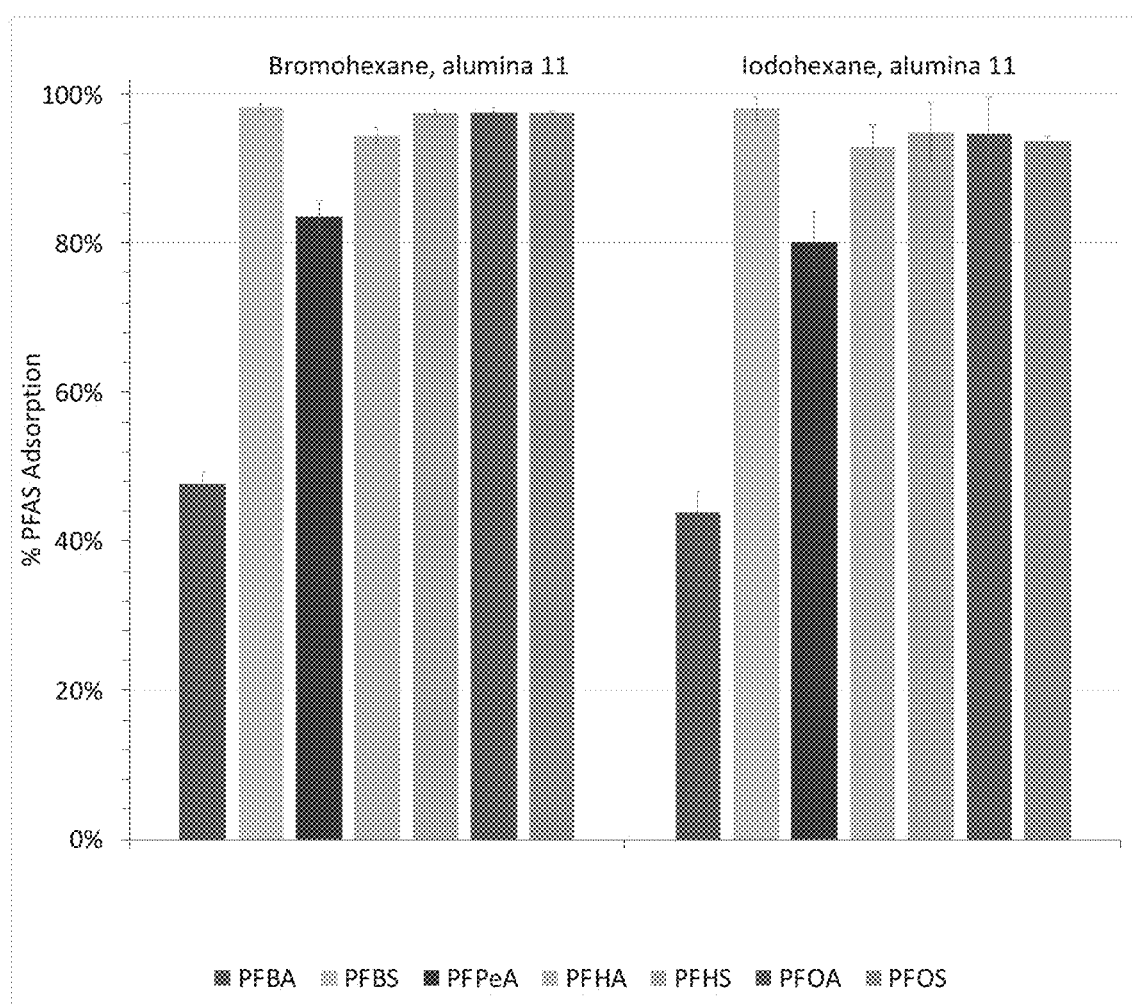
FIG. 14 shows a graph of a batch test for removal (% adsorption) of seven different PFAS contaminants in water using alumina functionalised with hexyl-PEI using either bromohexane or iodohexane as the alkylating agent.

The PFAS removal performance properties of the alumina 11 adsorbent materials were investigated in a 24 h batch test as performed previously. FIG. 14 shows the batch test data for the new compositions.

Example 5—Porosimetry Analysis of Granular Aluminas

Figure 15A:
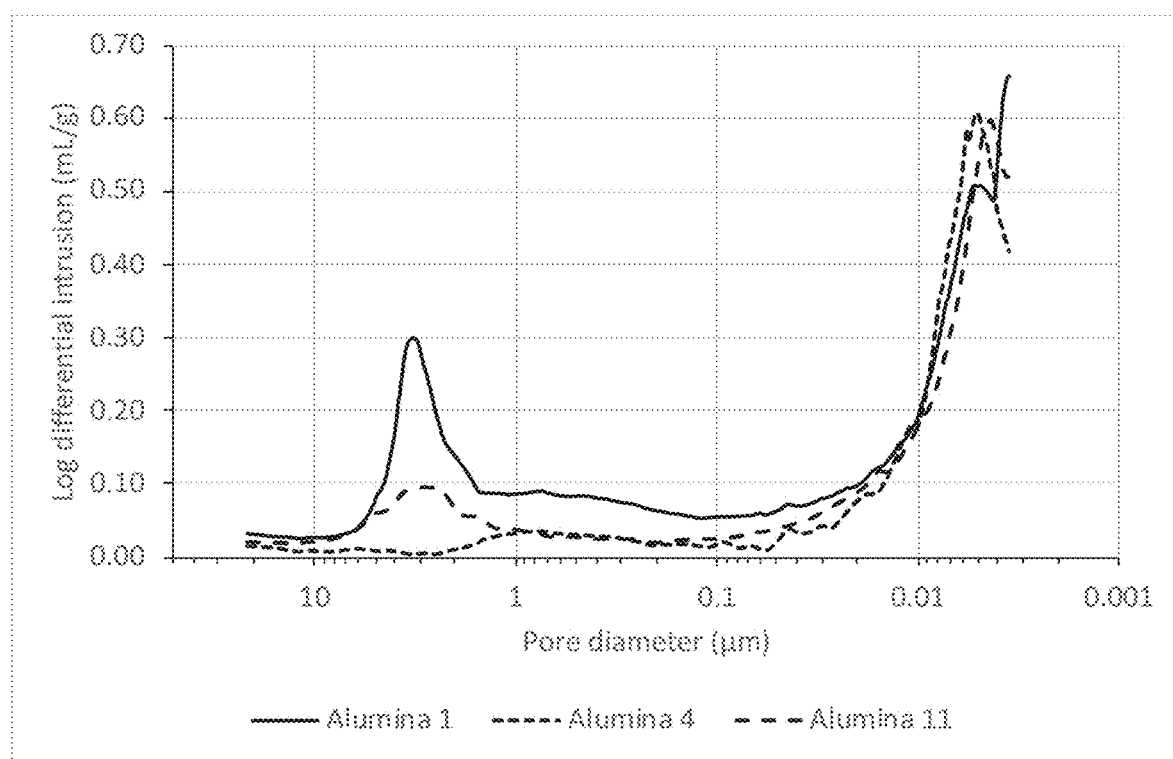
FIG. 15(a) shows a graph of Hg porosimetry data for three different granular alumina materials prior to functionalisation with sorbent molecule.

Although BET data for raw aluminas 1, 4 and 11 look very similar—meaning they have similar levels of micro- and mesoporosity (see Table 1), the Hg porosimetry data reveals key differences in the macroporosity of the 3 substrates. Aluminas 1 and 11 possess macroporosity (pores around 3 μm diameter) that alumina 4 does not. Surprisingly, this porosity, in addition to the mesopores around 3 to 8 nm in diameter, can lead to increased levels of functionality on the alumina surface and, in turn, increased PFAS removal performance. FIG. 15(a) shows data for the Hg porosimetry for raw aluminas 1, 4 and 11.

Figure 15B:
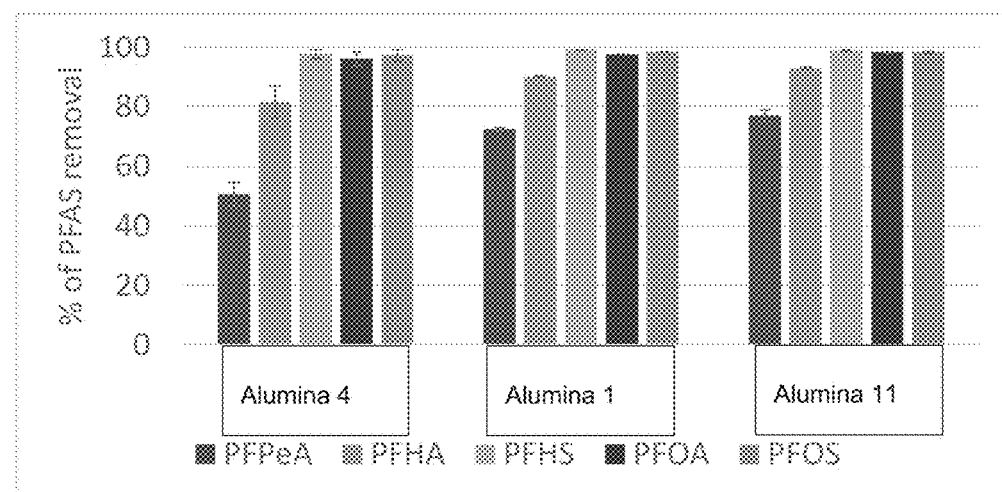
FIG. 15(b) shows a graph of a batch test for removal (% adsorption) of five different PFAS contaminants in water using the same three granular aluminas with hexyl-PEI functionalisation.

Although the presence of macroporosity is beneficial for performance, it also can cause the material to have impaired mechanical stability and the two factors must be balanced effectively depending upon the desired end use case. The level of macroporosity in alumina 4 leads to a material which is too physically fragile for use in certain types of water treatment applications. However, the lower level of macroporosity in alumina 11 compared with alumina 4 generates a material that is adequately stable for the intended application but also with improved PFAS removal performance compared with the solely mesoporous material. Performance batch data for hexyl-PEI functionalised aluminas 1, 4 and 11 is shown in FIG. 15(b). Elemental analysis data for the hexyl-PEI functionalised aluminas 1, 4 and 11 is shown in Table 13.

TABLE 13

Elemental analyses of functionalised aluminas 1, 4 and 11

| Material | Si (wt %) | C (wt %) | N (wt %) |
|---|---|---|---|
| Hexyl-PEI - Alumina 4 | 0.33 | 5.93 | 1.70 |
| Hexyl-PEI - Alumina 1 | 0.36 | 4.34 | 1.41 |
| Hexyl-PEI - Alumina 11 | 0.39 | 6.70 | 1.33 |

Example 6—Porosimetry Analysis of Powdered Aluminas

Figure 16:
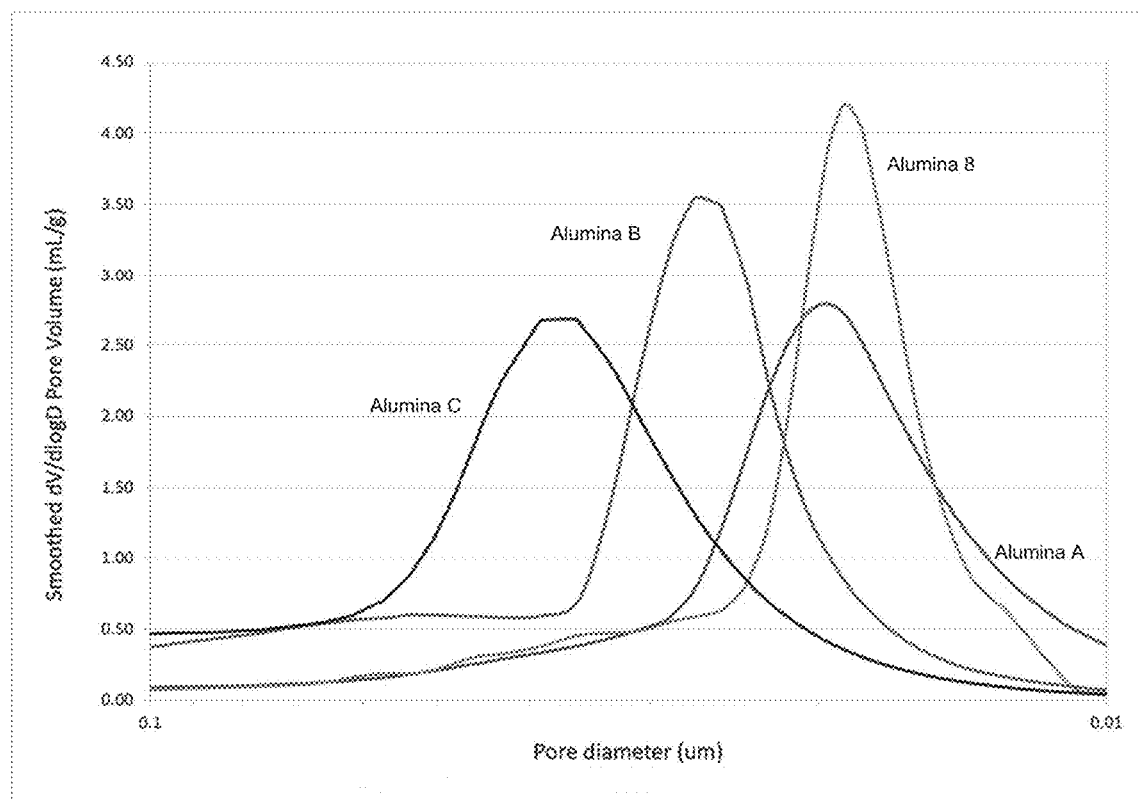
FIG. 16 shows a graph of Hg porosimetry data for four different powdered alumina materials alumina 8 and aluminas A-C.
Figure 17:
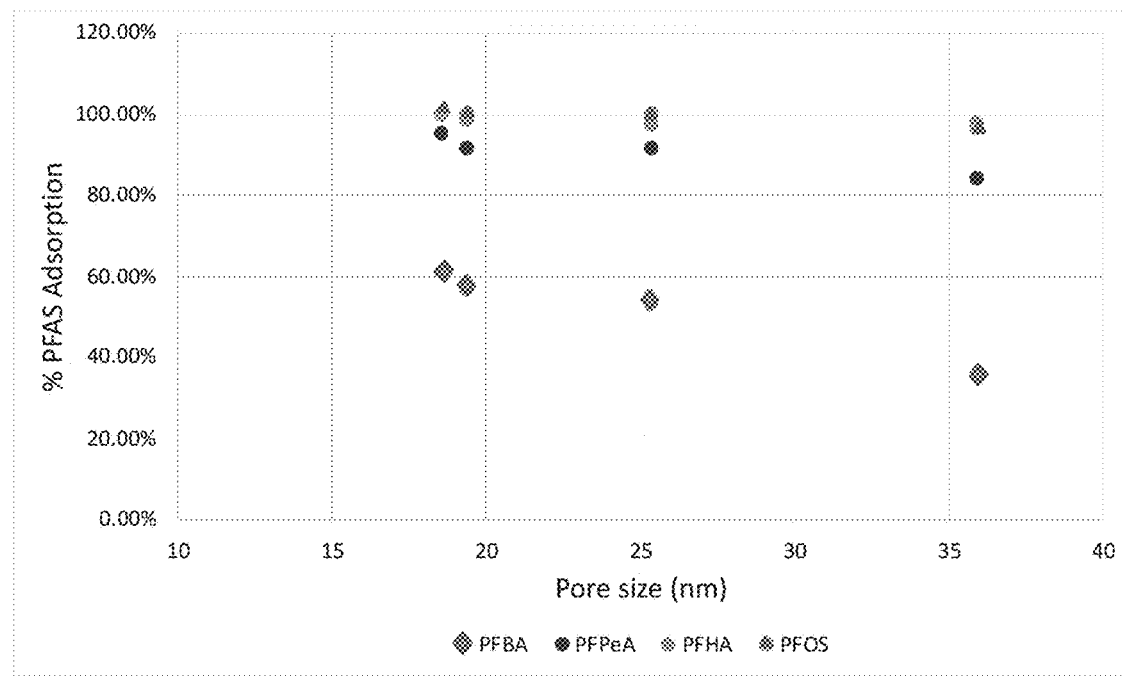
FIG. 17 shows a graph of a batch test for removal (% adsorption) of four different PFAS contaminants in water using the same four powdered aluminas as in FIG. 16 but with hexyl-PEI functionalisation but showing the effect of pore size.

A similar analysis to that carried out in Example 5 was repeated on powdered alumina materials based on alumina 8 or aluminas closely related thereto (called Aluminas A-C) and revealed a similar trend in pore size (see FIG. 16) and PFAS performance (see FIG. 17). However, the pore size range was shifted to larger mesopores with the range now between 18 to 40 nm compared to the 3 to 8 nm range of the granular aluminas. Unlike the granular media there is no initial increase in performance and instead performance decreases in line with increasing mesopore size (see FIG. 17). The elemental analysis data also broadly follows the same trend with a fall in % C content observed as pore size increases.

TABLE 14

Elemental analysis data for various functionalised powdered alumina materials

| Powdered Alumina Material | Si (wt %) | C (wt %) | N (wt %) | Average mesopore pore size (nm) |
|---|---|---|---|---|
| Alumina 8 | 0.35 | 15.18 | 1.73 | 19 |
| Alumina A | 0.32 | 15.4 | 1.43 | 19 |
| Alumina B | 0.35 | 13.98 | 1.56 | 25 |
| Alumina C | 0.36 | 11.94 | 1.63 | 36 |

Example 7—Testing of Spherical Alumina Particles

Another common form of alumina (in addition to powders and granules) is spherical particles which are often used as supports for catalysts, drying agents for gases and liquids and as hydrocarbon adsorbents. This form of adsorbent may have advantage for large industrial applications owing to the much larger particle size (mm range) which would incur a lower pressure drop for fluids passing through a packed bed comprised of the particles. The disadvantage of these substrates is the mechanical strength which poses a challenge both in application and synthesis of the functionalised spheres. Four different spherical alumina substrates, called S-1 to S-4, were trialled from two different manufacturer sources (see Table 15 below for physical properties).

TABLE 15

Physical properties of spherical alumina particles tested

| | S-1 | S-2 | S-3 | S-4 |
|---|---|---|---|---|
| Manufacturer | BASF | BASF | Sasol | Sasol |
| Particle size (μm) | Mesh 7 × 14 (0.6-1.1 mm) | Mesh 7 × 14 (0.6-1.1 mm) | 1.9 mm | 2.1 mm |
| BET surface area (m$^2$/g) | 282 | 340 | 9 | 143 |
| Pore volume (cm$^3$/g) | 0.35 | 0.34 | 0.02 | 0.51 |
| Average pore size BJH (nm) | 5 | 5 | 7 | 12 |

The S-1 and S-2 were functionalised using the standard procedure with alkylation (Step 3, Schemes 1 and 2) using iodohexane, whereas the S-3 and S-4 spheres were functionalised using the standard bromohexane procedure described previously.

The functionalisation of the alumina spheres was found to be lower in comparison with the granules, without wishing to be bound by theory this is thought to be due to abrasion during the synthetic process. However, the S-4 spheres showed promising performance indicators which is thought to be due to a bimodal porosity profile (having peaks of both meso- and macro-porosity) and overall higher porosity of these spheres.

TABLE 16

Elemental analysis data of hexyl-PEI functionalised alumina spheres

| Material | Si (wt %) | C (wt %) | N (wt %) |
|---|---|---|---|
| S-1 | 0.26 | 3.25 | 0.82 |
| S-2 | 0.12 | 1.27 | 0.41 |
| S-3 | 0.11 | 1.66 | 0.23 |
| S-4 | 0.29 | 8.29 | 1.30 |

Figure 18:
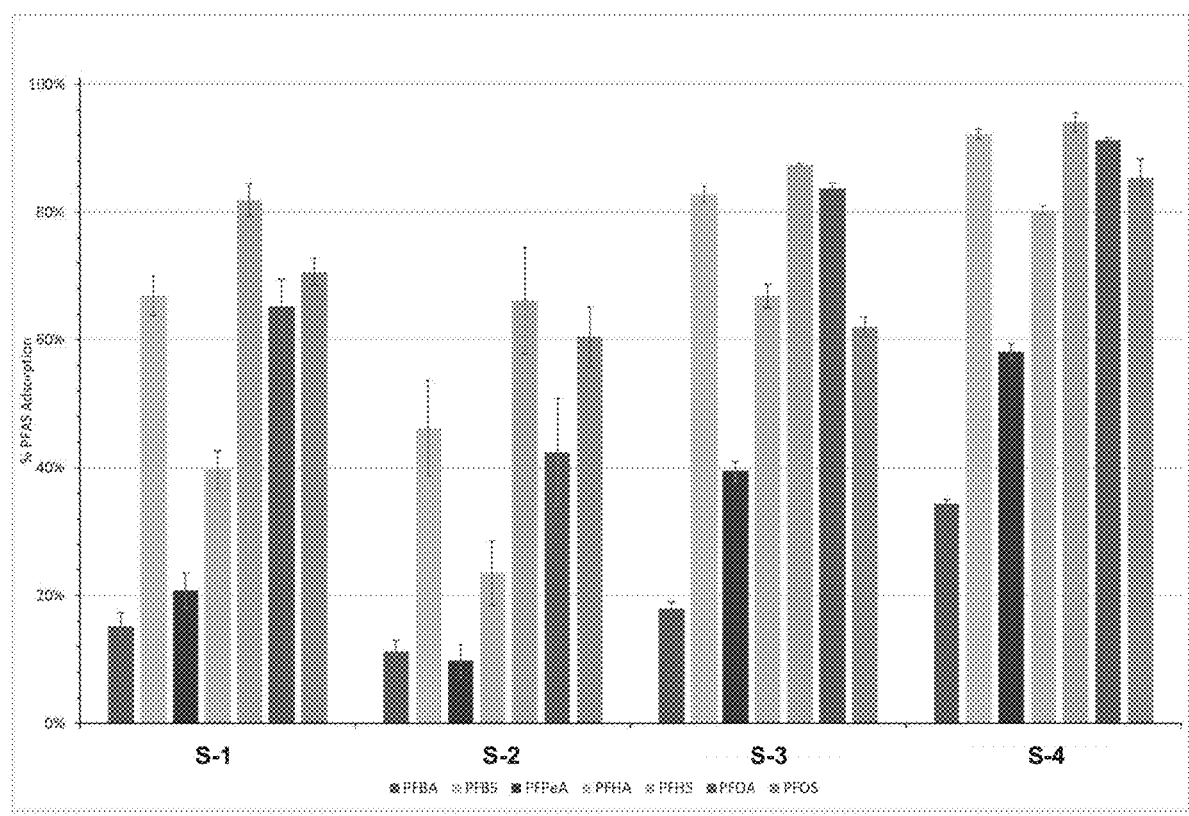
FIG. 18 shows a graph of a batch test for removal (% adsorption) of seven different PFAS contaminants in water using four spherical aluminas (S-1 to S-4) with hexyl-PEI functionalisation.

PFAS performance batch data for the hexyl-PEI functionalised Alumina spheres is shown in FIG. 18.

Example 8—Variation of the Molecular Weight of PEI Polymer

Acylated products were previously made and tested using aluminas 1 and 4 functionalised with 0.8, 1.8 kDa and 25 kDa PEI, see Example 1 and FIG. 3.

Figure 19:
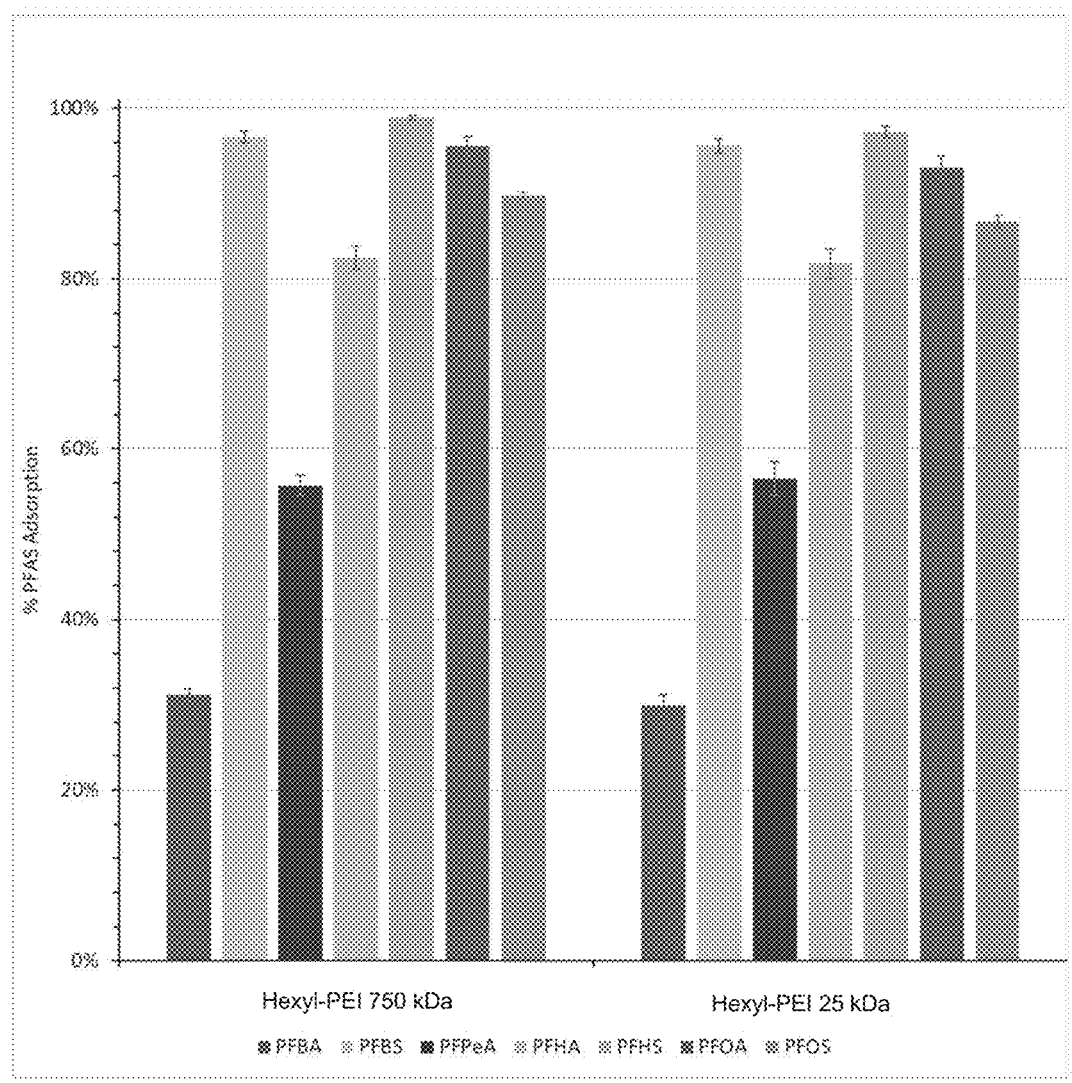
FIG. 19 shows a graph of a batch test for removal (% adsorption) of seven different PFAS contaminants in water using alumina functionalised with hexyl-PEI using two different molecular weights of PEI.

In this example hexylated-PEI product was made with 750 kDa PEI (same mass as usual synthesis) using alumina 11 and compared to hexylated-PEI with 25 kDa PEI. PFAS batch data performance for the larger 750 kDa PEI was found to be within error of the standard product made with 25 kDa hexyl-PEI, as is seen in FIG. 19. The comparison of the elemental analysis is shown in Table 17.

TABLE 17

Elemental analysis data for hexyl-PEI-functionalised alumina 11 made with 25 kDa and 750 kDa PEI

| Material | Si wt % | C wt % | N wt % |
|---|---|---|---|
| 25 kDa PEI | 0.29 | 6.20 | 1.17 |
| 750 kDa PEI | 0.25 | 6.59 | 1.16 |

Example 9—Use of Linear PEI and Variation of Chain Length

Analogous linear PEI functionalised materials were made using a trimethoxysilylpropyl modified polyethylenimine (1.5-1.8 kDa)—synthetic method below. Alkylation reactions were carried out using the standard method with different iodoalkanes of different carbon chain lengths. The materials were compared below to a branched PEI analogue.

Figure 20:
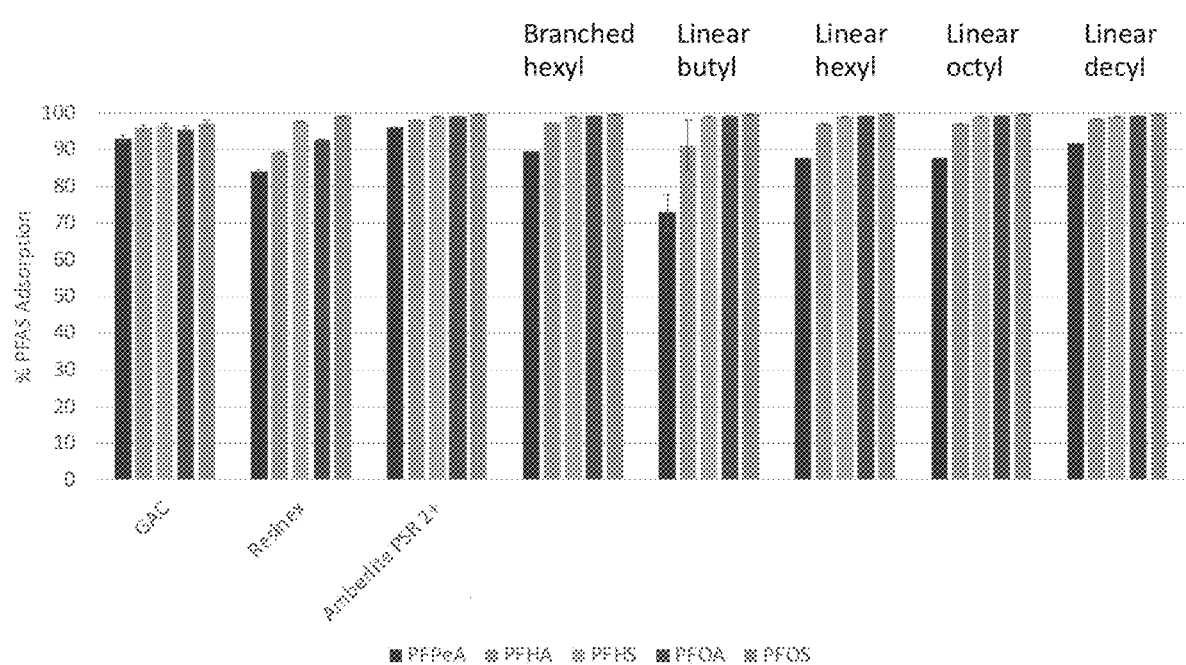
FIG. 20 shows a graph of a batch test for removal (% adsorption) of five different PFAS contaminants from water samples treated with granular activated carbon (GAC), Resinex and Amberlite that represent comparators for existing known sorbent materials. Using an alumina 8 substrate, four test compositions of embodiments of the invention using alkyl functionalised linear PEI were also tested versus one using an alkyl functionalised branched PEI.

The data indicates that several of these linear PEI functionalised materials perform as well as their branched counterparts. In terms of carbon-chain length, butyl performs significantly less well though C>6 perform equally well. PFAS performance batch data is shown in FIG. 20.

Synthetic Method for Linear PEI-Alumina

Alumina 8 (50 g) was carefully weighed into a tared Duran bottle containing isopropyl alcohol (250 mL), then slurried and poured into a 1 L three-necked flask in a heating block, with the 10 cm overhead stirring impeller turning at 150 rpm on addition. 1.65 kDa linear PEI-modified propyl-trimethoxysilane (66 mL, 50% in IPA) was added, and the reaction mixture was stirred at 65° C. overnight. After cooling, the powder was allowed to settle, then the reaction solution was removed. The crude product was then washed with IPA (3×250 mL), stirring for ~45 min and then settling for ~15 min each time. The washed material was then filtered through a sinter funnel, and dried in the vacuum oven at 80° C. (30 mbar) for ~4 h. Elemental analysis is shown in Table 18 below.

TABLE 18

Elemental analysis data for powdered adsorbents with different alkyl chains lengths

| PEI | Alkyl chain length | C (wt %) | N (wt %) | Si (wt %) |
|---|---|---|---|---|
| Branched | 6 | 14.4 | 3.72 | 0.31 |
| Linear | 4 | 9.37 | 2.06 | 0.33 |

TABLE 18-continued

Elemental analysis data for powdered adsorbents with different alkyl chains lengths

| PEI | Alkyl chain length | C (wt %) | N (wt %) | Si (wt %) |
|---|---|---|---|---|
| Linear | 6 | 11.8 | 2.28 | 0.32 |
| Linear | 8 | 13.7 | 2.13 | 0.36 |
| Linear | 10 | 15.0 | 2.37 | 0.33 |

Although particular embodiments of the invention have been disclosed herein in detail, this has been done by way of example and for the purposes of illustration only. The aforementioned embodiments are not intended to be limiting with respect to the scope of the appended claims, which follow. It is contemplated by the inventors that various substitutions, alterations, and modifications may be made to the invention without departing from the spirit and scope of the invention as defined by the claims.

What is claimed herein is:

1. A composition for removal of a poly- and perfluorinated alkyl substance (PFAS) from an aqueous liquid, the composition comprising:
   a particulate support material comprising a bimodal alumina having pores within a mesoporous range and pores within a macroporous range;
   (i) wherein a majority of the pores within the mesoporous range have an average pore size of between 2 nm and 50 nm; and
   (ii) wherein the bimodal alumina has a BET pore volume within the mesoporous range of not less than around 0.20 cm$^3$/g; and
   a sorbent molecule that comprises a linear or branched core polymer selected from one or more of: poly(ethylenimine); poly(allylamine); poly(methylmethacrylate); poly(vinylalcohol); poly(vinylamine); poly(vinylchloride); poly(2-vinylpyridine); poly(3-vinylpyridine); or poly(4-vinylpyridine);
   wherein the linear or branched core polymer is covalently linked to the particulate support material; and
   wherein the sorbent molecule further comprises one or more covalently linked sorbent groups.

2. The composition of claim 1, wherein the alumina has an average pore size within the mesoporous range of between about 2 about 20 nm.

3. The composition of claim 1, wherein a majority of the pores within the macroporous range have an average pore size of between 1 μm and 10 μm.

4. The composition of claim 1, wherein the core polymer comprises a linear or branched poly(ethylenimine) having a weight average molecular weight of not less than around 25 kDa.

5. The composition of claim 1, wherein the covalently linked sorbent groups comprise one or more groups selected from:
   a substituted or unsubstituted C1-C12 alkyl group; a substituted or unsubstituted C2-C12 alkenyl group; a substituted or unsubstituted C2-C12 alkynyl group; a substituted or unsubstituted C1-C12 alkoxy group; a substituted or unsubstituted C1-C12 acyl group; a substituted or unsubstituted aromatic hydrocarbon group; a substituted or unsubstituted aromatic group; a heterocyclic group; and a hydrogen atom.

6. The composition of claim 1, wherein the core polymer comprises at least one tertiary amino group and wherein the at least one tertiary amino group is converted to a quaternary nitrogen.

7. The composition of claim 1, wherein the core polymer comprises C1-C10 alkyl substituted linear poly(ethylenimine).

8. The composition of claim 1, wherein the core polymer comprises C1-C6 alkyl substituted branched poly(ethylenimine).

9. The composition of claim 1, wherein support material is in a form selected from: granular; powder; and spheroidal particles.

10. A process for removal of a target substance from a fluid stream that comprises water, the process comprising contacting the fluid stream with a composition as defined in claim 1, and wherein the target substance comprises one or more poly- and perfluorinated alkyl substances (PFAS).

11. The process of claim 10, wherein the PFAS is selected from a perfluorinated anionic surfactant compound, including one or more selected from the group consisting of: perfluorobutane sulfonate (PFBS); perfluorobutanoic acid (PFBA); perfluoropentanoic acid (PFPeA); perfluorohexanesulfonate (PFHS); perfluorohexanoic acid (PFHA); perfluorooctanoic acid (PFOA); perfluorooctane sulfonate (PFOS); perfluorononanoic acid (PFNA); and perfluorodecanoic acid (PFDA); 6:2 fluorotelomer sulfonic acid (6:2 FTSA); and hexafluoropropylene oxide dimer acid (HFPO-DA).

12. The process of claim 10, wherein the linear or branched PEI has weight average molecular weight of not less than around 25 kDa.

13. The process of claim 10, wherein the particulate alumina is in a form selected from: granular; powder; and spheroidal particles.

14. The process of claim 10, wherein the support material is comprised within a packed bed.

15. The process of claim 14, wherein the support material is comprised within a filter unit.

16. A filter for the adsorption of one or more PFAS from a contaminated water source, wherein the filter comprises a composition as described in claim 1.

17. The filter of claim 16, wherein the filter is configured as a point-of-use (POU) filter.

18. The filter of claim 17, wherein the filter is comprised within a replaceable cartridge.

19. The filter of claim 16, wherein the filter is configured to be incorporated into a point-of-entry (POE) system.

20. The filter of claim 16, wherein the composition is comprised within a packed bed that is configured to permit a minimum water flow rate there-through of at least 2 litres/min.

* * * * *